US006919039B2

(12) United States Patent
Lang et al.

(10) Patent No.: US 6,919,039 B2
(45) Date of Patent: *Jul. 19, 2005

(54) CHANNEL ASSISTED RESIN TRANSFER MOLDING

(76) Inventors: Eric J. Lang, 923 Talus Dr., Yellow Springs, OH (US) 45387; Richard W. Rydin, 4890 Destination Ct., Apt. 310, West Chester, OH (US) 45069

(*) Notice: Subject to any disclaimer, the term of this patent is extended or adjusted under 35 U.S.C. 154(b) by 414 days.

This patent is subject to a terminal disclaimer.

(21) Appl. No.: 10/161,442

(22) Filed: Jun. 3, 2002

(65) Prior Publication Data

US 2002/0146529 A1 Oct. 10, 2002

Related U.S. Application Data

(63) Continuation-in-part of application No. 08/412,539, filed on Mar. 28, 1995, now Pat. No. 6,406,659.

(51) Int. Cl.[7] .......................... B29C 43/12; B29C 70/44
(52) U.S. Cl. ..................... 264/510; 264/102; 264/257; 264/258; 264/313; 264/314; 264/511; 264/571; 425/388; 425/389
(58) Field of Search ............................... 264/510–512, 264/257–258, 102, 571, 313, 314, 317, 324; 425/388, 389

(56) References Cited

U.S. PATENT DOCUMENTS

| | | |
|---|---|---|
| 2,739,350 A | 3/1956 | Lampman |
| 2,913,036 A | 11/1959 | Smith |
| 2,977,269 A | 3/1961 | Nerwick |
| 3,382,125 A | 5/1968 | Lowdermilk, Jr. |
| 3,553,054 A | 1/1971 | Maus |
| 3,575,756 A | 4/1971 | Maus |
| 3,775,214 A | 11/1973 | Winters |
| 4,062,917 A | 12/1977 | Hill et al. |
| 4,068,704 A | 1/1978 | Wittmoser |
| 4,097,977 A | 7/1978 | Pollner |
| 4,128,375 A | 12/1978 | Schubart |
| 4,132,755 A | 1/1979 | Johnson |
| 4,133,626 A | 1/1979 | Schubart |
| 4,311,661 A | 1/1982 | Palmer |
| 4,330,250 A | 5/1982 | Pinkas |
| 4,560,523 A | 12/1985 | Plumley et al. |
| 4,562,033 A | 12/1985 | Johnson et al. |
| 4,622,091 A | 11/1986 | Letterman |
| 4,759,893 A | 7/1988 | Krauter |
| 4,836,765 A | 6/1989 | Kornitzky et al. |
| 4,853,170 A | 8/1989 | Bühler et al. |
| 4,902,215 A | 2/1990 | Seemann, III |
| 4,942,013 A | 7/1990 | Palmer et al. |
| 5,000,990 A | 3/1991 | Freeman |
| 5,013,514 A | 5/1991 | Azzani et al. |
| 5,108,532 A | 4/1992 | Thein et al. |
| 5,152,949 A | 10/1992 | Leoni et al. |
| 5,169,590 A | 12/1992 | Johnson et al. |

(Continued)

FOREIGN PATENT DOCUMENTS

| | | |
|---|---|---|
| EP | 0 348 831 A3 | 1/1990 |
| EP | 1 038 656 A1 * | 9/1999 |

*Primary Examiner*—Stefan Staicovici
(74) *Attorney, Agent, or Firm*—Frost Brown Todd LLC

(57) ABSTRACT

The present invention relates to methods and apparatus of molding composite parts by liquid resin infusion. The invention involves the creation of temporary resin distribution channels on the surface of a preform to aid in the distribution of resin during infusion. In general, these methods are improvements over the art because the molds are cheaper to make, the parts produced are of higher quality, minimal waste is produced and the time to infiltrate the preform is reduced. Hollow tubes with moveable portions provide Channels which Assist in Resin Transfer Molding of composites (CARTM).

29 Claims, 16 Drawing Sheets

U.S. PATENT DOCUMENTS

| | | |
|---|---|---|
| 5,366,684 A | 11/1994 | Corneau, Jr. |
| 5,374,388 A * | 12/1994 | Frailey .................. 264/510 |
| 5,439,635 A | 8/1995 | Seemann |
| 5,665,301 A * | 9/1997 | Alanko .................. 264/571 |
| 6,031,212 A * | 2/2000 | Westerman et al. ......... 219/535 |
| 6,257,858 B1 * | 7/2001 | Pabsch et al. ........... 425/129.1 |
| 6,406,659 B1 * | 6/2002 | Lang et al. .................. 264/510 |
| 6,586,054 B2 * | 7/2003 | Walsh .................... 427/430.1 |
| 2002/0020934 A1 * | 2/2002 | Hinz ........................ 264/40.6 |

* cited by examiner

CHANNEL ASSISTED RESIN TRANSFER MOLDING

CROSS-REFERENCE TO RELATED APPLICATION

This application is a continuation-in-part of U.S. patent application Ser. No. 08/412,539, filed Mar. 28, 1995 now U.S. Pat. No. 6,406,659.

BACKGROUND OF THE INVENTION

There are many processes available for the purpose of impregnating a preform with liquid resin in order to make a composite. These processes may be broadly characterized into two categories. One category includes wet lay-up methods while the other category features some form of resin infusion such as resin transfer molding (RTM).

Wet lay-up processes tend to have lower average quality than resin infused parts. They are labor intensive to manufacture because each layer of preform material must be individually coated with resin and carefully positioned by hand. One frequent problem with wet lay-up methods is air bubble entrapment inside the composite while the resin is being applied to the preform. A second difficulty is achieving a uniform part thickness and fiber volume fraction which ultimately influence the material properties. Another problem with wet lay-up processes is the excessive amount of fumes given off by the exposed resin before and during cure.

Resin infusion methods are carried out in a closed system which eliminates most of the fumes. Resin infusion processes can also infuse resin into a preform with a vacuum thus avoiding air bubble entrapment. Resin infusion methods allow for better control over part dimensions and fiber volume fraction. Thus, resin infusion methods overcome many of the limitations of wet lay-up processes. Unfortunately, until recently resin infusion processes tended be more expensive than wet lay-up because of the more expensive molding apparatus required. In the past, a rigid closed mold was required. Even though closed mold methods are improvements over wet lay-up methods, there are problems with closed mold methods beyond that of cost. When infiltrating high volume fraction preforms, standard closed mold methods require high resin injection pressures and long infiltration times because the low permeability of high volume fraction preforms.

More recently, several novel vacuum infusion techniques were introduced which do not require an expensive closed mold. Instead, they incorporate a single rigid mold surface upon which the preform rests. The preform is covered by a impermeable sheet and is sealed at its periphery forming a preform cavity which can be evacuated using a vacuum pump. Atmospheric pressure provides both the compaction force on the preform and also the driving force for resin infusion from an external supply into the lower pressure preform cavity. Despite the simplicity of this approach there are still problems with the infusion process because many high viscosity resins cannot adequately infiltrate into low permeability preforms.

The resistance to resin infiltration increases with the distance the resin must flow through the preform. Typically, in vacuum assisted resin infusion, the injection pressure cannot exceed the ambient atmospheric pressure without pressing the outer sheet away from the preform. Thus, infiltration is often slow and incomplete. Often, regions of the preform are not infiltrated with resin, while excess resin collects in undesired locations.

One clever way to overcome the problem of a low permeability preform is to artificially increase the permeability at certain locations within the preform cavity. There have been several embodiments of this fundamental concept in the art. These include but are not limited to: placement of tubular arteries between adjacent preform layers, drilling an array of holes in a rigid plate which rests on the preform, and the use of a distribution medium on top of the preform. All these methods have their own limitations. Of these methods, the processes incorporating a distribution medium are the most useful. They are also the most closely related methods to those disclosed in the present patent and therefore will be described in greater detail.

In the distribution medium process, a preform is placed on a tool surface and covered with a permeable sheet. A distribution medium is placed on top of the permeable sheet and is covered with a continuous non-permeable sheet sealed at its periphery. A vacuum is drawn on the entire assembly of preform, permeable sheet, and distribution medium. Resin is introduced to the distribution medium which provides high permeability pathways for the resin to distribute itself over the entire top surface of the preform. The injection pressure, which must be less than atmospheric pressure, forces most of the resin through the permeable membrane and into the preform. Satisfactory resin impregnation is usually achieved since there is a relatively small resistance to infiltration of the preform in the thickness direction in comparison with the in-plane direction. The lower resistance to infiltration also results in shorter infusion times.

Despite the benefits of this improved resin infusion method, it still has some disadvantages which make it unattractive for many applications. When resin comes into contact with the distribution medium it remains trapped in the distribution medium and is subsequently cured. After the resin has cured, the permeable membrane, the clogged distribution medium, and the impermeable outer membrane must be separated from the composite part and discarded as waste. While the process is quite useful for proto-typing and low volume production, the amount of waste produced is incompatible with the required efficiencies of mass production.

These and other problems remain in the field of infusion molding of composite structures. In this patent we describe novel means of overcoming the aforementioned difficulties.

SUMMARY OF THE INVENTION

The molding methods and apparatus of the present invention have many different uses, and the apparatus can take on different forms. An example is provided of infiltrating an advanced composite preform, which is an assemblage of reinforcing fibers, with a liquid plastic resin. What, in general, could be any low permeability material will in the following disclosure be called the "preform." The infiltrating fluid could be one of many different fluids, such as gases, liquids, and liquids containing suspended solid particles, which in the description are collectively referred to hereafter as "resin."

The preform can be can be made from a variety of reinforcing fibers including fiberglass, Kevlar (aramid) fibers, and carbon fibers. There are many types and configurations of fibers and yarns made from fibers. The yarns may be formed into many different types of assemblages including weaves, braids, and knits as well as short and long fiber mats. Different types of fibers may be combined in an assemblage to form a hybrid preform. All these and other variations are known by those skilled in the art. The preform may also include inserts of various types such as foam cores, honeycomb cores, balsa wood, metal inserts and reinforcements. Additionally, the preform may contain sensors or other devices. All of these components are known in the prior art.

The resin is any of a variety of curable liquid resins such as polyester, vinyl ester, and epoxy. The resins may be catalyzed for high temperature cure or room temperature cure and for various cures times as is compatible with the needs of the molding process. The resin should be properly catalyzed and degassed prior to injection into the preform cavity. The wide variety of useful resins and the methods of preparing the resin are all widely known in the art.

In each of the embodiments of the invention, it is desirable that a vacuum be drawn on the cavity containing the preform prior to beginning the flow of resin. In this way, the problem of entrapping an air bubble in the resin is avoided. A source of vacuum may continue to be applied to the preform cavity during the infiltration of resin and until the resin has cured or it may be removed at some point during the infiltration. Even if the source of vacuum is removed (by closing a valve for example), the space inside the preform cavity should remain substantially a vacuum during resin infiltration if the preform cavity is properly sealed. In some embodiments of the invention, it is possible to infiltrate the preform with resin without initially drawing a vacuum on the preform cavity, however these embodiments introduce the possibility of trapping an air bubble in the preform.

The number and position of the sources of vacuum and resin depend on the specific application. Each resin and vacuum source is able to be controlled individually using a valve or other means of stopping the flow of material. The flow of resin should be stopped when sufficient resin has entered the mold. This may be controlled by properly adjusting the resin gel time and/or measuring the amount of resin that has entered the mold and stopping the flow of resin when a pre-metered amount of resin has entered the mold, or using a sensor to control the flow of resin into the mold.

The present invention relates to a method of molding a composite by flowing a resin into a permeable preform contained in a molding apparatus comprising: providing a mold surface with movable portions that form resin flow channels in the mold surface when positioned away from a surface of the preform; allowing the resin to flow along the resin flow channels and from the resin flow channels into the preform; moving the movable portions of the mold surface toward the surface of the preform; then curing the resin in the preform thereby forming the composite.

More specifically, the present invention encompasses a method for molding a composite by infusing a resin into a preform contained in a mold, comprising:

a. providing a mold surface;
b. placing said preform on said mold surface;
c. placing a first flexible impermeable membrane over a portion of said preform, said first impermeable membrane having a preform side adjacent said preform;
d. placing an impermeable spacer system on said first flexible impermeable membrane, said first flexible impermeable membrane having a spacer system side adjacent said impermeable spacer system;
e. sealing said first flexible impermeable membrane to said impermeable spacer system, thereby enclosing a network of gaps and forming a bladder;
f. providing a means of adjusting a spacer system pressure on said spacer system side of said first flexible impermeable membrane;
g. placing a second flexible impermeable membrane over said impermeable spacer system and said preform;
h. drawing a vacuum on said preform;
i. providing a source of said resin in communication with said preform side of said first flexible impermeable membrane;
j. applying a resin pressure on said preform side of said first flexible impermeable membrane that is higher than said spacer system pressure on said spacer system side of said first flexible impermeable membrane thereby creating a differential pressure that deforms said first flexible impermeable membrane into said network of gaps in said impermeable spacer system, said first flexible impermeable membrane forming temporary resin flow pathways on said preform while deformed into said network of gaps;
k. flowing said resin along said temporary resin flow pathways and from said temporary resin flow pathways into said preform;
l. reversing said differential pressure thereby causing said first flexible impermeable membrane to press evenly upon said preform to remove said temporary resin flow pathways;
m. curing said resin in said preform to form said composite.

In a variation of the method the invention encompasses a method of molding a composite by flowing a resin into a preform comprising:

a. providing a mold surface;
b. placing said preform on said mold surface;
c. placing a first flexible impermeable membrane over a portion of said preform, said first impermeable membrane having a preform side adjacent said preform;
d. placing a spacer system on said first flexible impermeable membrane, said first flexible impermeable membrane having a spacer system side adjacent said spacer system;
e. placing a second flexible impermeable membrane over said spacer system;
f. sealing said first flexible impermeable membrane to said second flexible impermeable membrane, thereby enclosing said spacer system and forming a bladder;
g. providing a means of adjusting a spacer system pressure on said spacer system side of said first flexible impermeable membrane;
h. placing a third flexible impermeable membrane over said second impermeable membrane and said preform;
i. drawing a vacuum on said preform;
j. providing a source of said resin in communication with said preform side of said first flexible impermeable membrane;
k. applying a resin pressure on said preform side of said first flexible impermeable membrane that is higher than said spacer system pressure on said spacer system side of said first flexible impermeable membrane thereby creating a differential pressure that deforms said first flexible impermeable membrane into a network of gaps in said spacer system, said first flexible impermeable membrane forming temporary resin flow pathways on said preform while deformed into said network of gaps;
l. flowing said resin along said temporary resin flow pathways and from said temporary resin flow pathways into said preform;
m. reversing said differential pressure thereby causing said first flexible impermeable membrane to press evenly upon said preform to remove said temporary resin flow pathways;

n. curing said resin in said preform to form said composite.

In another variation, the invention encompasses a method (CARTM resin tube method) for molding a composite by infusing a resin into a preform contained in a mold, comprising:

a. providing a mold surface;
b. providing at least one hollow tube comprising a tube inside and a tube outside;
   i. said tube outside having a tube base;
   ii. said mold surface surrounding at least a portion of said hollow tube and structurally adapted to hold said tube base substantially adjacent to said preform;
   iii. said tube base having a movable portion, comprising a compliant material;
   iv. said movable portion being structurally adapted to move in response to a differential pressure between a tube pressure on said tube inside and a base pressure on said tube base;
   v. said movable portion being in an open position when said movable portion is positioned away from said preform;
   vi. said movable portion being in a closed position when said movable portion is positioned substantially adjacent said preform; and
   vii. said movable portion forming a temporary resin flow pathway on said preform when said movable portion is in said open position;
c. providing a differential pressure-adjustment means for adjusting said differential pressure;
d. forming said resin flow pathway by moving said movable portion to said open position;
e. providing a source of said resin in communication with said temporary resin flow pathway;
f. flowing said resin along said temporary resin flow pathway and from said temporary resin flow pathway into said preform;
g. moving said movable portion to said closed position to remove said temporary resin flow pathway; and
h. curing said resin in said preform to form said composite.

The invention also encompasses a method (CARTM vacuum tube method) for molding a composite by infusing a resin into a preform comprising:

a. providing a mold surface;
   i. said mold surface having a movable portion;
   ii. said movable portion being in an open position when said movable portion is positioned away from said preform;
   iii. said movable portion being in a closed position when said movable portion is positioned substantially adjacent said preform; and
   iv. said movable portion and said preform forming a vacuum channel when said movable portion is in said open position;
b. providing a source of vacuum in communication with said vacuum channel;
c. infusing said preform with said resin;
d. forming said vacuum channel by moving said movable portion to said open position;
e. flowing said resin from said preform into said vacuum channel;
f. moving said movable portion to said closed position; and
g. curing said resin in said preform.

This method can be an aid to other methods of molding a composite.

The present invention also relates to the apparatuses used to carry out these processes, specifically, an apparatus for molding a composite by infusing a resin into a preform contained in a mold, comprising:

a. a mold surface;
b. at least one hollow tube comprising a tube inside and a tube outside;
   i. said tube outside having a tube base;
   ii. said mold surface surrounding at least a portion of said hollow tube and structurally adapted to hold said tube base substantially adjacent to said preform;
   iii. said tube base having a movable portion, comprising a compliant material;
   iv. said movable portion structurally adapted to move in response to a differential pressure between a tube pressure on said tube inside and a base pressure on said tube base;
   v. said movable portion being in an open position when said movable portion is positioned away from said preform;
   vi. said movable portion being in a closed position when said movable portion is positioned substantially adjacent said preform; and
   vii. said movable portion and said preform forming a resin flow pathway when said movable portion is in said open position;
c. a means for providing a flow of said resin to said resin flow pathway; and
d. a differential pressure-adjustment means for adjusting said differential pressure;

whereby said resin flows along said resin flow pathway during said infusing and said movable portion is in said closed position when said resin cures.

The present invention also relates to a vacuum-based apparatus for molding a composite by infusing a resin into a preform contained in a mold, comprising:

a. a mold surface;
b. at least one hollow tube comprising a tube inside and a tube outside;
   i. said tube outside having a tube base;
   ii. said mold surface surrounding at least a portion of said hollow tube and structurally adapted to hold said tube base substantially against said preform;
   iii. said tube base having a movable portion comprising a compliant material;
   iv. said movable portion structurally adapted to move in response to a differential pressure between a tube pressure on said tube inside and a base pressure on said tube base;
   v. said movable portion being in an open position when said movable portion is positioned away from said preform;
   vi. said movable portion being in a closed position when said movable portion is positioned substantially adjacent said preform; and
   vii. said movable portion and said preform forming a vacuum channel when said movable portion is in said open position;
c. a means for providing vacuum to said vacuum channel; and
d. a differential pressure-adjustment means for adjusting said differential pressure;

whereby said vacuum channel provides a distributed source of vacuum during said infusing and said movable portion is in said closed position when said resin cures.

Finally, the present invention encompasses the tube device used in the above apparatuses and method, comprising:

a. a hollow tube comprising a tube inside and a tube outside;
b. said tube outside having a tube base;
c. said tube base having a movable portion comprising a compliant material;
d. said movable portion structurally adapted to move in response to a differential pressure between a tube pressure on said tube inside and a base pressure on said tube base;
e. said hollow tube having a predetermined cross-section and pliability such that said tube base is substantially flat when said tube inside pressure minus said tube base pressure is a predetermined closure pressure, and such that said tube base forms a resin flow pathway when said tube inside pressure minus said tube base pressure is a predetermined opening pressure.

DETAILED DESCRIPTION OF THE INVENTION

Temporary Resin Distribution Channels

Figure 1:
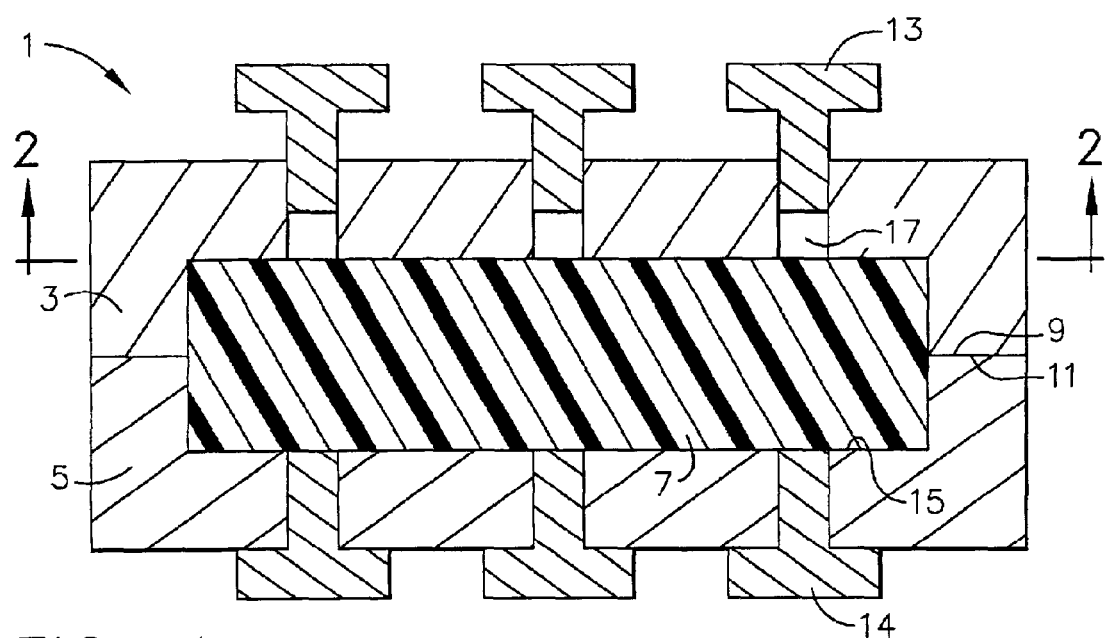
FIG. 1 shows mechanical channels.

As is discussed in the Background of the Invention, the prior art contains various means of aiding the distribution of resin over the surface of a preform for the infiltration of a preform with resin. However, none of these methods provides a means of creating temporary resin distribution pathways on the surface of the preform. The advantage of temporary resin distribution channels over the use of a distribution medium is a major reduction in the amount of waste material produced. When producing composites in large quantities, this large amount of waste is costly and a source of pollution and therefore should be eliminated.

Though there are many features and embodiments of the present invention, the essence of the invention is a method and the related apparatus for molding a composite by infusing resin into a permeable preform, comprising the creation of temporary resin channels on the surface of the preform, flowing resin along the channels and from the channels into the preform, stopping the flow of resin, removing the temporary channels if desired, curing the resin in the preform and forming a composite. The methods disclosed in this patent are able to produce a composite if the temporary resin distribution channels are not removed before curing the resin. In this case, cured resin channels remain on the surface of the preform. This is not desirable in most applications and therefore, in the preferred embodiments of the invention, the resin flow channels are removed prior to curing the resin so that there are no cured resin flow channels on the surface of the composite.

There are several means of creating temporary resin distribution channels. One method comprises activating movable portions of the mold surface to create a network of resin distribution channels on the surface of the preform and deactivating them to remove the channels. These movable portions of the mold surface can be constructed in various ways. In a rigid mold, sections of the mold can be made so they are retractable. These portions can be retracted to create the resin flow channels and extended to remove the channels after sufficient resin has entered the preform cavity. The retractable sections of the rigid mold should be constructed in such a way that they do not leak resin.

Constructing retractable sections on the internal surface of the mold makes the mold more expensive than the usual mold used in RTM. However, the speed of infiltration allowed by having high permeability pathways over the surface of the preform is worth the extra cost. This method retains the advantages of closed mold RTM such as good dimensional accuracy and high fiber volume fraction while overcoming difficulties such as high injection pressures and slow infiltration of resin when infiltrating high volume fraction preforms.

Another method of creating temporary resin distribution channels is to have mechanically movable portions of the mold surface which are made of a stiff elastomeric material. A means of deforming the stiff elastomeric material into resin distribution channels is provided in the body of the mold. This embodiment of the invention provides a simple, cost-effective means of creating temporary resin distribution channels in the surface of the mold. After resin has infiltrated the preform, the stiff elastomeric portions of the mold are pushed into a position flush with the surface of the preform. At this point, curing of the resin may begin.

Instead of deforming or moving portions of rigid molds, a thin flexible membrane can be placed over the preform and portions of the membrane can be caused to deform into resin distribution channels by various means. These embodiments have advantages over the previous embodiments in terms of the cost and ease of making and preparing the mold.

One of the means of deforming the flexible impermeable membrane involves applying mechanically or electromechanically induced forces at distributed points along the surface of the flexible membrane. These forces cause the membrane to move away from the surface of the preform temporarily to allow the resin to flow over the surface of the preform.

There are various embodiments of the invention which use an impermeable flexible membrane which is temporarily deformed into resin distribution channels on the surface of a preform. One set of these embodiments relies on a differential pressure between the preform side of the flexible membrane and the other side of the membrane. By properly applying a higher pressure on the preform side of the membrane than the other side of the membrane, the flexible membrane will deform into temporary resin distribution channels. When the proper amount of resin has infiltrated the preform, a source of fluid (usually air) at the proper pressure is applied to the channels in the mold surface. The applied pressure should be greater than the pressure of the resin under the flexible membrane. In this way the resin distribution channels on the surface of the preform are collapsed and the flexible membrane presses down evenly and smoothly over the preform.

One method of applying a differential pressure between the two sides of the flexible membrane is to cover the flexible membrane with a mold backing that contains a network of channels in its surface. Resin is then introduced to the preform side of the flexible membrane at a pressure higher than the pressure on the other side of the membrane. This causes the membrane to be forced out and away from the preform and the membrane then takes on the shape of the internal surface of the containing mold backing. Since this containing mold has a network of channels in its surface, the flexible membrane now has created a network of resin distribution channels on the surface of the preform.

In one embodiment of the invention which uses a flexible impermeable membrane covered by a mold with internal surface channels, the mold is made from a rigid sheet material with channels impressed upon its surface. The rigid sheet material may be sheet metal or other suitable rigid sheet materials which can be formed into the proper shape. As with the majority of the embodiments of the invention described in this disclosure, it is desirable to maintain a vacuum in the cavity containing the preform. Additionally, it is desirable in this embodiment to maintain a vacuum in the channels in the surface of the rigid sheet above the flexible membrane. Thus, before resin is introduced, there is a vacuum on both sides of the flexible membrane and therefore, the flexible membrane does not deform. Additionally, the ambient atmospheric pressure presses down upon the rigid sheet which in turn presses down on the flexible membrane in regions where there is not a channel. These regions of the flexible membrane in turn press down upon the preform compacting it to a high fiber volume fraction. When liquid resin is introduced under the flexible membrane, the resin presses the flexible membrane into the channels in the surface of the rigid sheet thereby creating temporary resin distribution channels on the surface of the preform. These high permeability channels allow the resin to easily and quickly spread out over the preform and infiltrate the preform quickly and completely. Since all points in the preform are only relatively short distances from a channel in a properly designed channel network, the resin has no difficulty reaching all points in the preform. After resin has impregnated the preform, the vacuum in the channels is removed and atmospheric pressure or higher is applied to the channels forcing the flexible membrane against the preform.

In another embodiment of the flexible impermeable membrane covered by a mold with internal surface channels, the mold is made from thick rigid material with a network of channels formed in its surface. The rigid material may be a stiff material such as steel. This embodiment provides greater dimensional accuracy for the composite. Also, the compacting pressure is not limited to atmospheric pressure. Higher resin injection pressures are possible since the thick and rigid material can support the flexible membrane. Thick and rigid molds are more expensive and difficult to make than rigid sheets with channels. This is especially true for very large parts. Thus, both embodiments are useful and the specific application will determine which embodiment is most appropriate.

Each of the previous two embodiments of the invention require that the pressure on the preform side of the flexible membrane exceed the pressure on the other side of the membrane. The preferred method of creating this situation is to apply a source of vacuum to the channels in the internal surface of the mold. It is possible to include a layer of porous material known in the art as breather material between the mold surface and the flexible membrane to aid in quickly and evenly evacuating the channels.

An alternate method of causing the flexible membrane to deform into temporary resin distribution channels which still relies on a differential pressure between the preform side of the flexible membrane and the other side of the membrane but does not use a mold with a network of channels in its surface is to use a spacer system. A spacer system is a system of sturdy shapes inter-connected in such a way that they provide a network of gaps into which the flexible membrane can deform to create temporary resin distribution channels when the pressure on the preform side of the flexible membrane exceeds the pressure on the other side of the membrane where the spacer systems is located.

There are many appropriate forms of the spacer system. One form, called a link mat, is a geometric array of spacer blocks connected to each other with link rods. The blocks and link rods can be made of plastic or other suitably sturdy material. The link mat is placed on top of the flexible impermeable membrane which is in contact with the preform and then covered with an additional flexible impermeable membrane which is able to be sealed against the first membrane. The purpose of the second membrane is to allow a reduced pressure to be applied to the cavity containing the spacer system.

Another form of spacer system is similar to a woven mat which is also covered with an impermeable outer cover. The mat consists of large flexible rods in the weft direction held together with thin yarns in the warp direction. This arrangement produces a series of channels between the larger rods. The flexible membrane deforms into these channels during resin infusion and the resin distribution channels formed under the membrane and on the surface of the preform aid in flowing resin over the surface of the preform. When higher pressure fluid such as air is introduced to the cavity containing the fabric mat, the impermeable membrane between the preform and the fabric mat is pushed smoothly and evenly against the preform.

Yet another form of the spacer system is a bubble mat or inflatable bubble mat. A bubble mat is a flexible sheet with an array of bubbles on its surface. An inflatable bubble mat has a series of small inter-connections which allow the bubbles to be inflated or deflated. In both cases, the gaps between the bubbles provide a network of channels for the flexible membrane in contact with the preform to deform into when the pressure on the preform side of the flexible membrane is higher than the pressure on the bubble mat side.

The spacer systems discussed above may also contain a layer of breather material to aid in quickly and evenly adjusting the pressure in the spacer system cavity.

In one embodiment, the flexible membrane and the spacer system is combined into one unit. An inflatable bubble mat is placed on a preform which is resting on a tool surface. The bubble mat is sealed at its periphery on the tool surface so that a vacuum can be drawn on the preform cavity. The bubbles in the bubble mat are then inflated which causes the bubble mat to lift away from the preform and thereby create a system of resin distribution channels on the surface of the preform. Resin is injected under the bubble mat and flows through the channels and from the channels into the preform. When sufficient resin has entered the preform cavity, the source of resin is stopped and the bubbles are deflated allowing the bubble mat to press down smoothly and evenly over the surface of the preform.

The flexible impermeable membrane that deforms to form the temporary resin flow pathways does not have to cover the entire preform. Instead, the flexible impermeable membrane can cover only a portion of the preform. In one embodiment, the spacer system is impermeable and is sealed to the flexible membrane. A second flexible impermeable membrane covers the impermeable spacer system and the preform, and this second flexible impermeable membrane is sealed at its periphery to the tool surface. The combined impermeable spacer system and flexible impermeable membrane form a bladder that can be collapsed using a pressure differential to form temporary resin flow pathways or inflated to remove the temporary resin flow pathways. In another embodiment, the spacer system is sandwiched between two flexible impermeable membranes that are sealed to each other at their periphery thereby forming a bladder. A third flexible impermeable membrane covers the bladder and the preform, and this third flexible impermeable membrane is sealed at its periphery to the tool surface. Multiple bladders may be used over different portions of the preform.

In the embodiments of the invention disclosed so far, the temporary resin distribution channels have been created by either mechanically moving sections of the mold surface or deforming a flexible impermeable membrane by some means. In another set of embodiments of the invention, the temporary channels on the surface of the preform comprise a flexible mold material containing interior channels below the surface. A resin pressure on the preform side of the flexible mold greater than the pressure in the channels below the surface of the flexible mold causes the flexible mold material between the channels and the preform to deform into the interior channels and thereby create resin distribution channels on the surface of the preform. It is preferable in this embodiment of the invention that a vacuum be drawn on the cavity containing the preform and that a vacuum also be drawn on the channels below the surface of the flexible mold material during resin infusion. After a sufficient amount of resin has entered the preform, the source of resin and vacuum are stopped and a pressure higher than the pressure of the resin in the preform cavity is applied to the channels. This causes the material between the preform and the channels to move toward the preform and become flush with the surface of the preform. Curing the resin after the channels have been removed provides a composite with a smooth surface.

Channel Assisted Resin Transfer Molding (CARTM)

The flexible mold material containing interior channels can take on a number of distinct geometric configurations. In all these methods of molding a composite by infusing resin into a preform contained in a mold, there is a mold surface that has a movable portion. The movable portion is in an open position when the movable portion is positioned away from the preform. The movable portion is in a closed position when the movable portion is positioned substantially adjacent the preform. The movable portion and the preform form a resin flow pathway when the movable portion is in the open position. A source of resin is provided in communication with the resin flow pathway.

The method proceeds by forming a resin flow pathway by moving the movable portion to an open position. Then, resin from the source of resin flows along the resin flow pathway and from the resin flow pathway into the preform. When the preform has been infused with resin, the movable portion of the mold surface is moved to the closed position. Finally, the resin cures in the preform and thereby forms the composite.

In one set of embodiments, the flexible mold material is in the form of a hollow tube, and the movable portion of the mold surface is a portion of the hollow tube. The movable portion of the mold surface is a movable compliant material. Suitable materials are compatible with the resin, and the temperatures experienced during molding. One material suitable for most commonly used resins is clear PVC.

The hollow tube has a tube inside and a tube outside. The tube outside has a tube base that faces the preform. The movable portion of the hollow tube is a portion of the tube base. The movable portion is such that a differential pressure between a tube pressure on the tube inside and a preform pressure on the tube base can move the movable portion between the open position and the closed position and between the closed position and the open position depending on the differential pressure.

There are several arrangements for creating the differential pressure. In cases where the mold is able to support injection pressures above atmospheric pressure, resin injected at pressure creates a differential pressure between the tube inside and the preform that forces the movable portion away from the surface of the preform into the open position. When the infusion is complete, the resin injection pressure is decreased, thereby decreasing the differential pressure and allowing the movable portion to return to the closed position. Thus, the differential pressure can be controlled by controlling the resin pressure only. This is one form of a differential pressure-adjustment means.

More control over the differential pressure is possible by controlling the resin pressure and the tube pressure in combination. This introduces a variety of differential pressure-adjustment means such as a tube pressure-adjustment means. For example, a tube pressure-adjustment means, thereby controlling the differential pressure, can consist of a source of pressurized fluid (such as air, water, oil, etc.) connected to the tube inside via a valve or pressure regulator. When the resin pressure and thus the preform pressure is high and the tube pressure is low, the movable portion moves to the open position. When the resin pressure and thus the preform pressure is low and the tube pressure is high, the movable portion moves to the closed position.

One simple way to create a tube pressure-adjustment means for adjusting the tube pressure is to use atmospheric pressure or compressed air, and a source of vacuum. To increase the differential pressure, a vacuum is drawn on the tube inside. To decrease and, if necessary, reverse the differential pressure, the tube inside is exposed to atmospheric pressure or compressed air. This is a simple, low-cost, and fast way to move the movable portion between the open position and the closed position.

In order to avoid trapping air in the resin, and to assist in flowing the resin into the preform, a vacuum can be drawn on the preform during the flowing of the resin. In fact, with a vacuum drawn on the preform, resin at atmospheric pressure can be infused into the preform.

The hollow tube needs to resist collapsing against the preform so that the movable portion can be in the open position during resin infusion. Some hollow tube designs are self-supporting and do not collapse against the preform even when there is a vacuum in the mold. These flexible tubes can be can be placed over curved preforms and complex geometries allowing the method to be useful in a wide variety of applications. Other tubes, such as thin walled tubes, might have a tendency to collapse against the preform when a vacuum is drawn on the mold. In order to prevent this type of tube from collapsing, the hollow tube can be placed in a channel in an extrusion that shields the hollow tube from forces that might collapse the tube against the preform. The extrusion has a constant cross-section and can be made from either a rigid or flexible material. In either case, the extrusion can support the forces that might otherwise tend to collapse the hollow tube against the preform.

Instead of an extrusion with a channel, a rigid backing with channels may cover the hollow tubes and the preform. The rigid backing can help to define the shape of the composite. If the preform is placed on a rigid tool surface and then a rigid backing with channels (and hollow tubes in the channels) is placed on the preform, a two-sided mold is created. Alternatively, the preform can rest on a tool surface, and an impermeable membrane can cover the hollow tubes and the preform and serve as part of the molding apparatus that contains the preform. If the tube in a channel in an extrusion method is used, an impermeable membrane can cover the hollow tube, the extrusion, and the preform and serve as part of the molding apparatus that contains the preform.

Vacuum Channel

When using a vacuum to infuse a resin into a preform contained in a mold, it is important that the resin flow front does not progress in such a way as to create "islands" of dry preform. If islands do form, the vacuum source connected to the preform cannot reach the islands and the resin may not completely fill the preform. One way to help prevent this problem is to use hollow tubes with movable portions similar to those described above. The movable portion and the preform form a vacuum channel when the movable portion is in the open position. Instead of providing a source of the resin in communication with the resin flow pathway, one can provide a source of vacuum in communication with the vacuum channel. The vacuum channel spreads out the source of vacuum and thereby minimizes the chance of an island forming. By using several vacuum channels over the surface of the preform, islands can be eliminated. A distributed vacuum is also useful for removing volatiles that are given off by some resins.

The process works as follows. First, the preform is infused with resin while the vacuum channel is in the open position. Resin flows from the preform into the vacuum channel, and then the resin flows along the vacuum channel toward the source of vacuum. When the preform has been infused with resin, the movable portion is moved to the closed position. Finally, the resin is cured in the preform, thereby forming the composite.

Also, a plurality of resin flow pathways may be used to more easily and quickly infuse the preform. Similarly, a plurality of vacuum channels may be used to provide a more distributed vacuum. The resin flow pathways and the vacuum channels can be used in combination to infuse the preform and to provide a distributed vacuum source. Typically, the resin flow pathways and the vacuum channels are positioned in an alternating sequence parallel to each other.

In the figures, accompanying this application, FIG. 1 shows generally a mold 1 with upper 3 and lower 5 halves enclosing a preform 7. The mold upper and lower halves meet at surfaces 11 and 9. Mechanically movable portions of the mold 14 are shown aligned with the internal mold surface 15. The mechanically movable portion of the mold 13 is retracted to create a network of resin flow channels 17.

Figure 2:
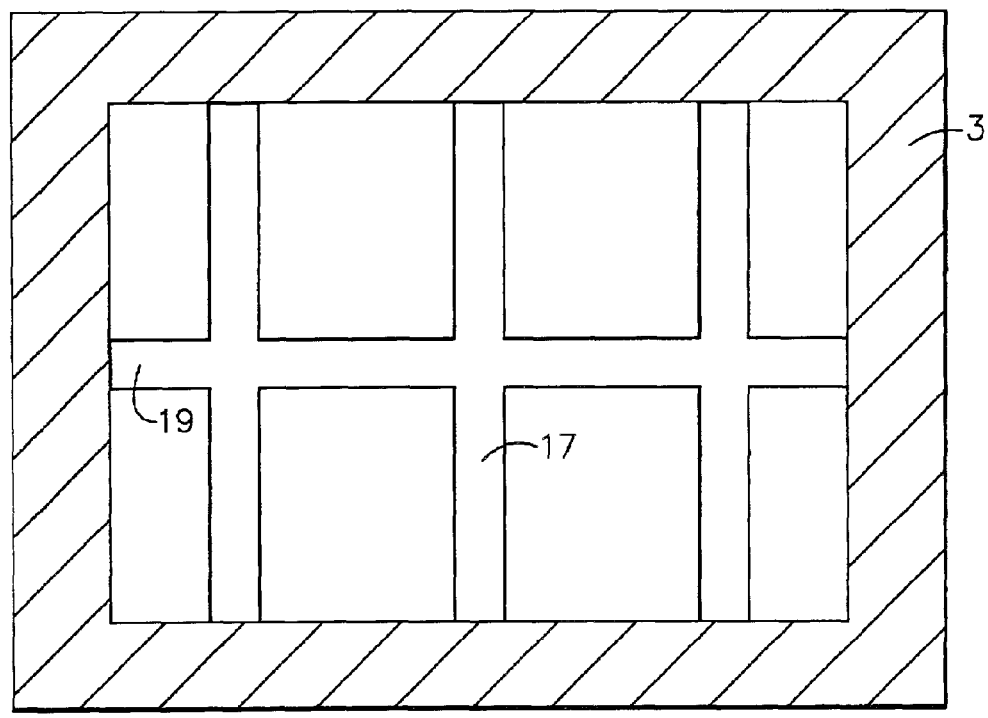
FIG. 2 is a section through 2—2 of FIG. 1.

FIG. 2 shows a cross-sectional view of the upper mold half 3 with the preform removed. The network of vertical 17 and horizontal 19 resin flow channels allows resin to easily spread out over the surface of the preform and then into the preform. Obviously, there are many different possible configurations of the resin flow channels.

Figure 3:
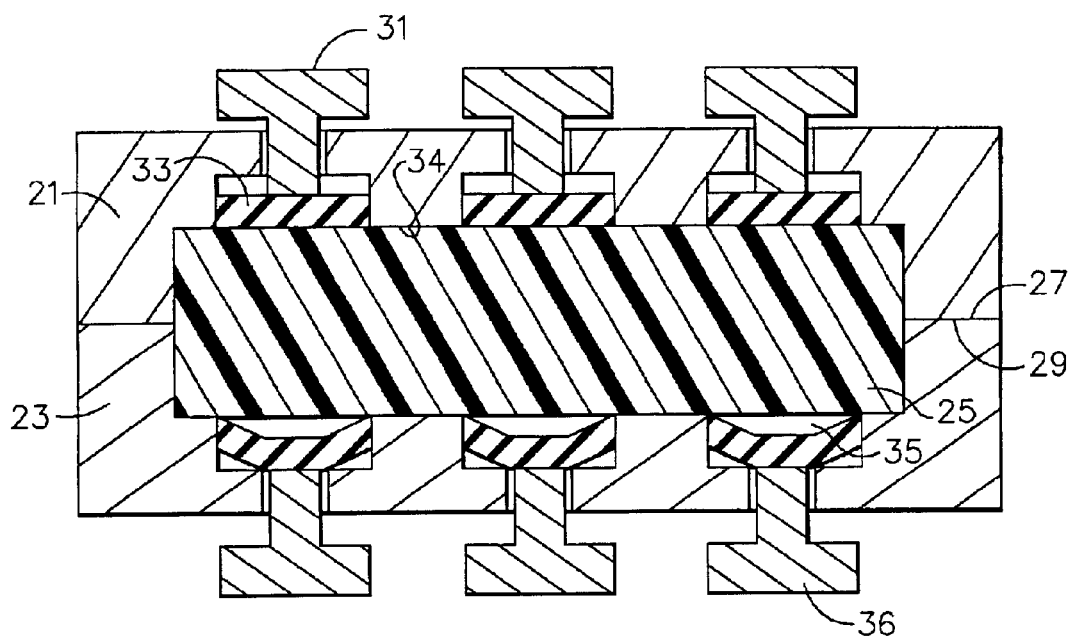
FIG. 3 shows mechanically moved membranes.

FIG. 3 shows a modified mold with upper 21 and lower 23 halves enclosing a preform 25. The mold upper and lower halves meet at parting line surfaces 29 and 27. Mechanically movable portions of the mold 31 are attached to flexible portions of the mold surface 33 in a position aligned with the internal mold surface. The mechanically movable portions 36 are retracted thereby creating a network of resin distribution channels 35 in the surface of the mold.

Figure 4:
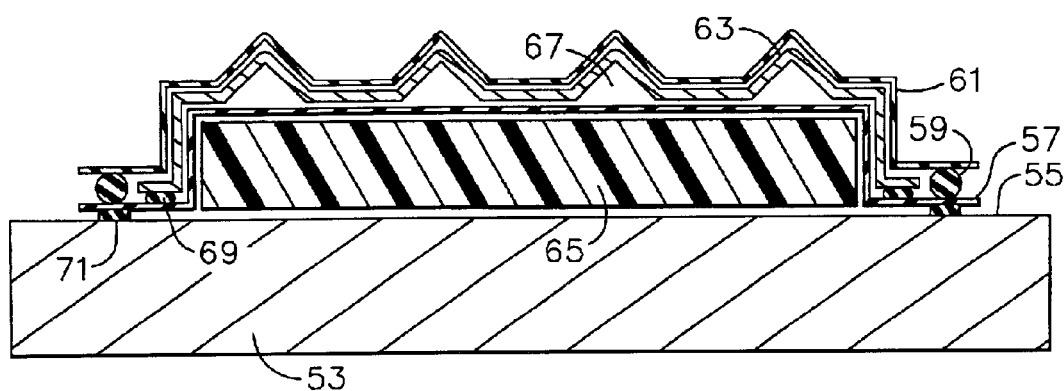
FIGS. 4 and 5 show membranes and a rigid sheet.
Figure 5:
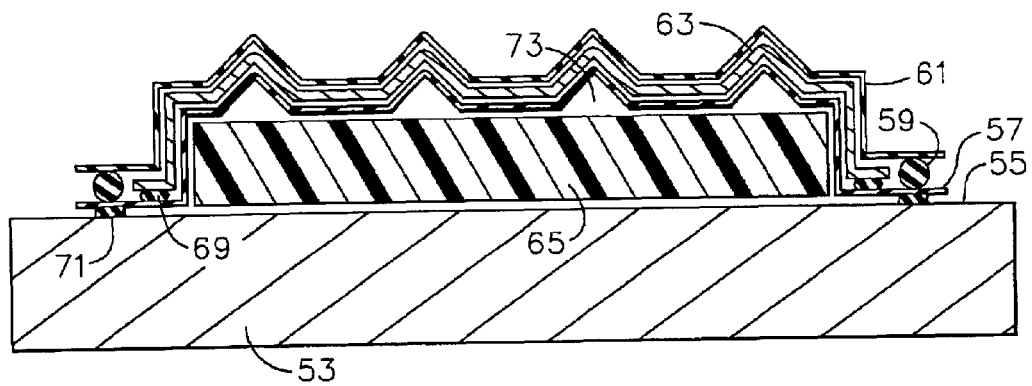

FIG. 4 shows a tool 53 with a surface 55 on which is placed a preform 65. The preform is covered with a flexible membrane 57 which is sealed at its periphery using a seal 71. A rigid sheet of material 63 with a network of resin distribution channels 67 is placed over the flexible membrane 57 and sealed at its periphery with a seal 69. An additional flexible impermeable membrane 61 is placed over the rigid sheet 63 and sealed at its periphery with a seal 59. FIG. 5 shows the apparatus of FIG. 4 with the flexible membrane 57 deformed into the channels in the rigid sheet 63 thereby creating a resin distribution channel 73 on the surface of the preform 65. The outer impermeable membrane 61 helps to maintain the seal on the cavity containing the rigid sheet.

Figure 6:
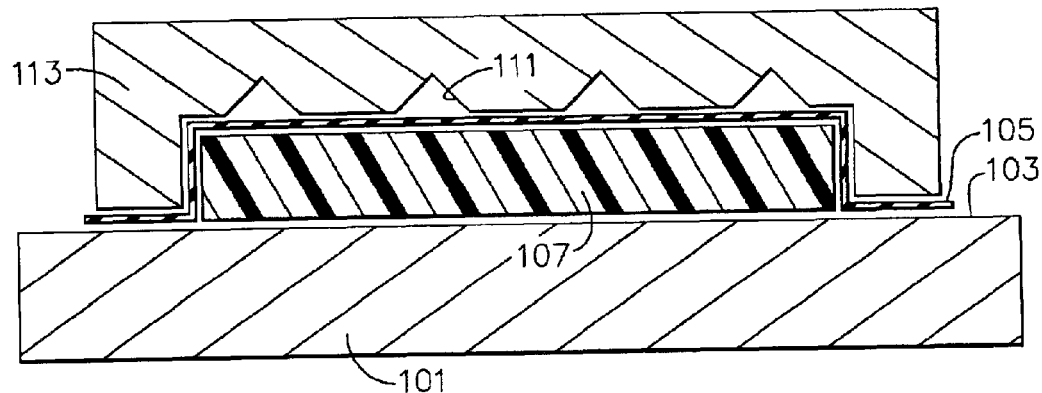
FIGS. 6 and 7 show a membrane and a rigid mold.
Figure 7:
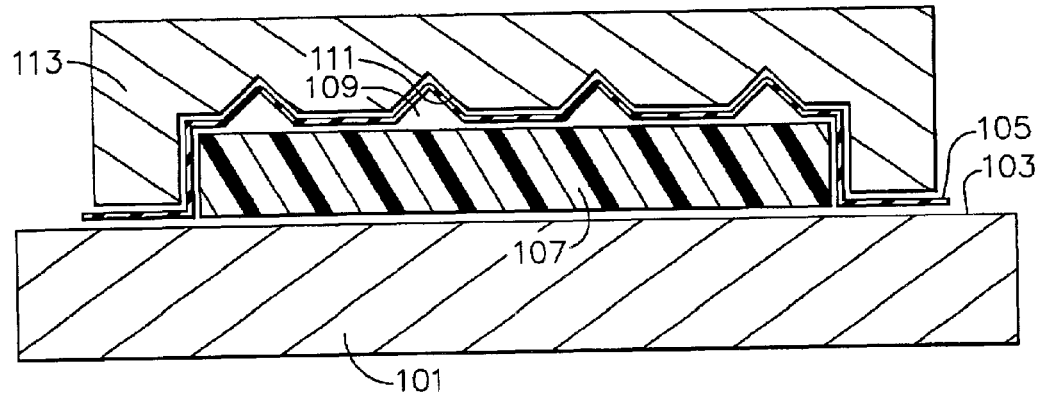

FIG. 6 shows a tool 101 and tool surface 103 onto which a preform 107 has been placed. The preform is covered with a flexible membrane 105 over which is placed a rigid mold 113 which has a network of channels 111 in its surface. FIG. 7 shows a similar arrangement. In FIG. 7, a preform 107 is placed on a tool surface 103 of a tool 101. A flexible membrane 105 is placed over the preform 107 and a rigid mold half 113 is placed over the flexible membrane 105. The flexible membrane 105 deforms into channels 111 in upper mold half 113 thereby creating resin flow channels 109.

The process of deforming the flexible membranes into the channels in the surface of rigid sheets or rigid molds involves applying a source of resin to the preform side of the membrane and reducing the pressure on the other side of the flexible membrane. Preferably, a vacuum is created in the channels in the mold. To aid in this process, it is useful to use a breather material between the flexible membrane and the mold. The breather material allows a vacuum to develop evenly throughout all the channels.

Figure 8:
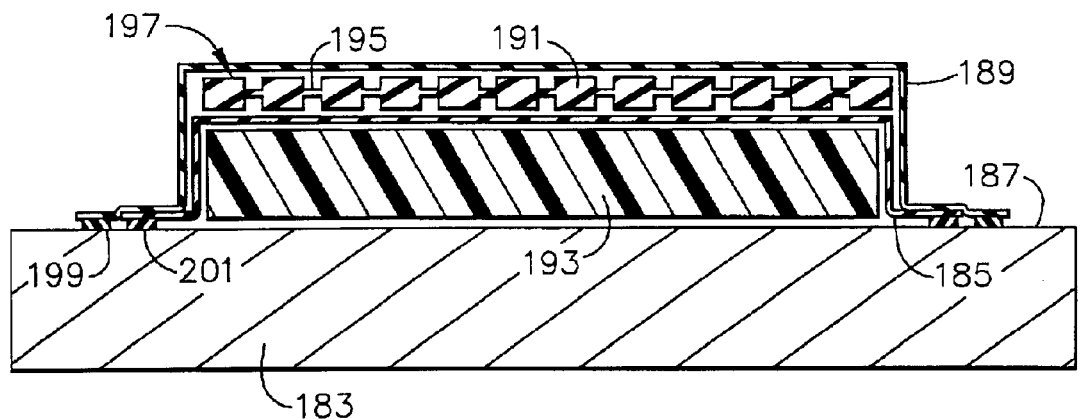
FIGS. 8–10 show details of a spacer and membranes.

FIG. 8 is the first in a series of figures depicting apparatus for creating temporary resin flow channels on the surface of a preform using a flexible membrane, a spacer system, and a differential pressure between the preform side of the membrane and the spacer system side of the flexible membrane. FIG. 8 shows a tool 183 and tool surface 187 upon which is placed a preform 193 which in turn is covered with an impermeable flexible membrane 185 sealed at its periphery with a seal 201. On top of the flexible membrane is a spacer system 197 and over the spacer system is another impermeable flexible membrane 189 which is also sealed at its periphery with a seal 199. The spacer system is any device capable of separating the two membranes so that a differential pressure between the preform and the cavity containing the spacer system causes the flexible membrane 185 to deform into a network of temporary resin distribution channels on the surface of the preform. Obviously there are many types and forms of suitable spacer systems.

Figure 9:
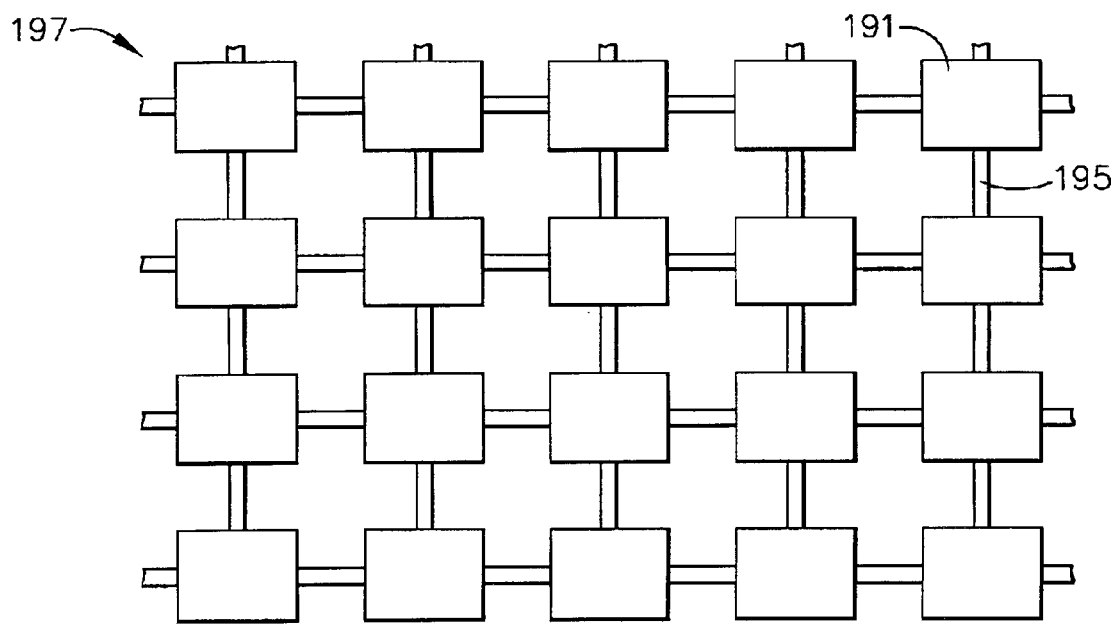
Figure 10:
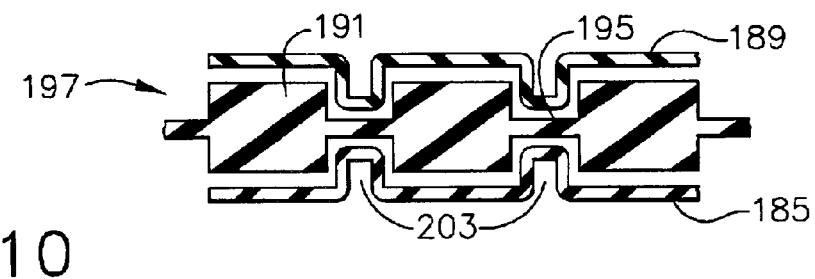
Figure 11:
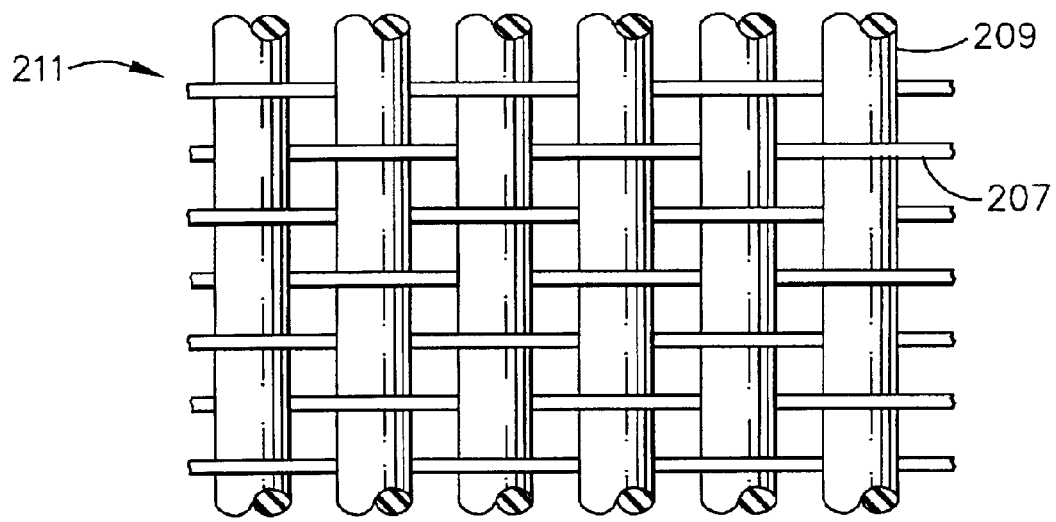
FIGS. 11 and 12 show details of an alternate spacer.
Figure 12:
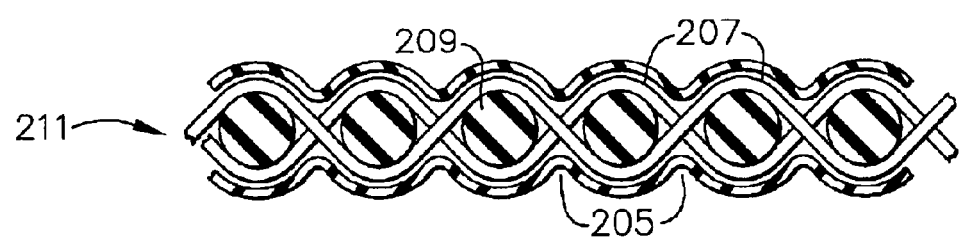

Two spacer systems are shown in FIGS. 9–12 in more detail. FIG. 10 shows an individual spacer 191 and an inter-connecting link 195 between two spacers. Additionally, the flexible membranes are deformed to create resin distribution channels 203. FIG. 9 shows a top view of the spacer system 197. When properly designed, a spacer system is able to conform easily to the surface of a preform. FIG. 12 shows in detail a spacer system made from a special fabric. Flexible rods 209 inserted in the weft direction are held together with smaller yarns 207 in the warp direction. The flexible membrane is deformed to create temporary resin distribution channels 205. FIG. 11 shows a top view of the fabric spacer system 211 with rods 209 and connecting yarns 207.

Figure 13:
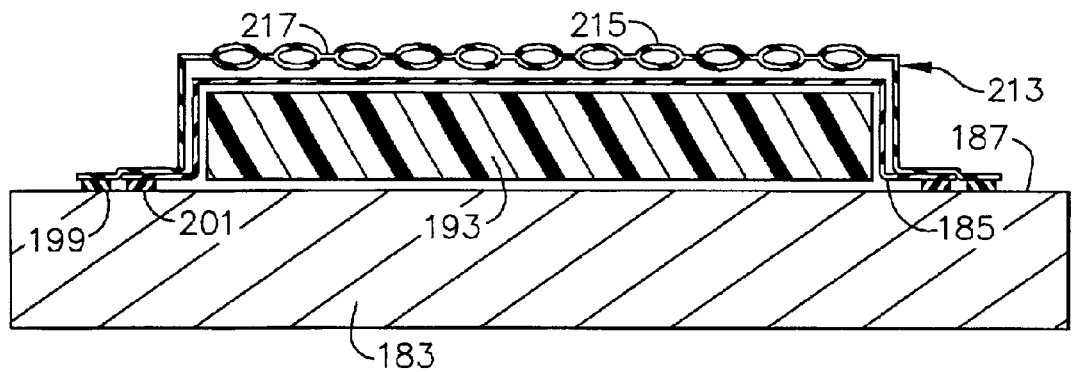
FIGS. 13–15 show details of a bubble mat used with a membrane.
Figure 14:
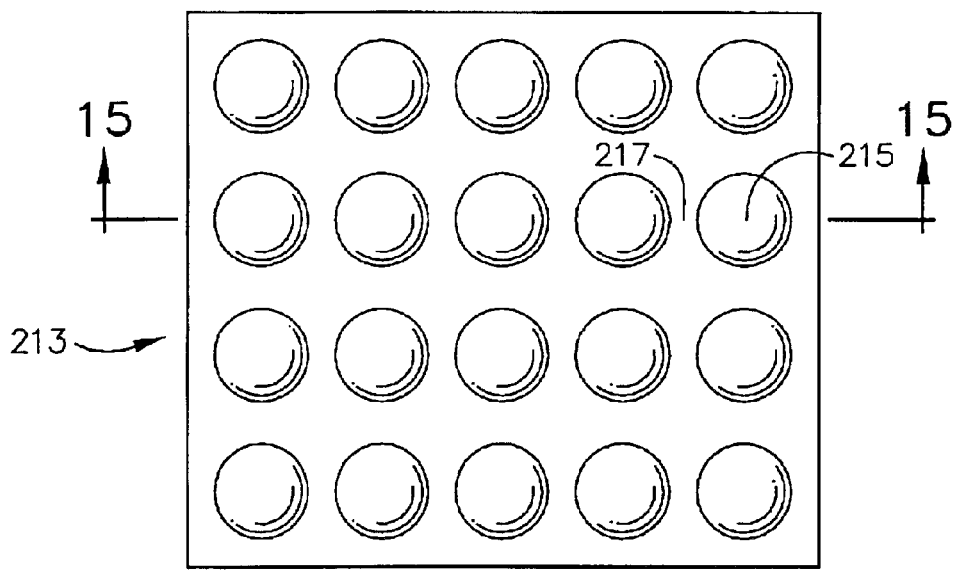
Figure 15:

FIG. 13 shows the apparatus of FIG. 8 except the spacer system 197 and outer flexible membrane 189 are replaced with a bubble mat 213. The bubble mat is similar to that used as padding when shipping delicate items. The details of the bubble mat are shown in FIGS. 14 and 15. In FIG. 14, the bubble mat 213 is shown in a top view. An array of bubbles 215 is held together by connecting material 217. The flexible membrane 185 is deformed into the space between the bubbles to create temporary resin distribution channels.

Figure 16:
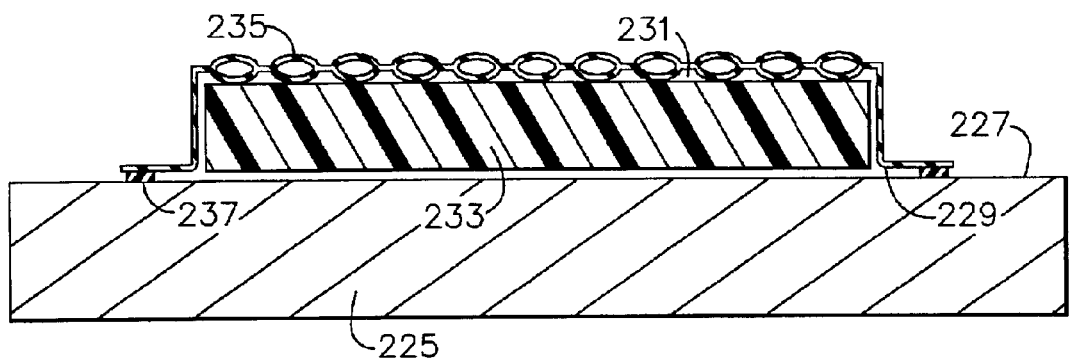
FIGS. 16–18 show details of an inflatable bubble membrane and mold.
Figure 17:
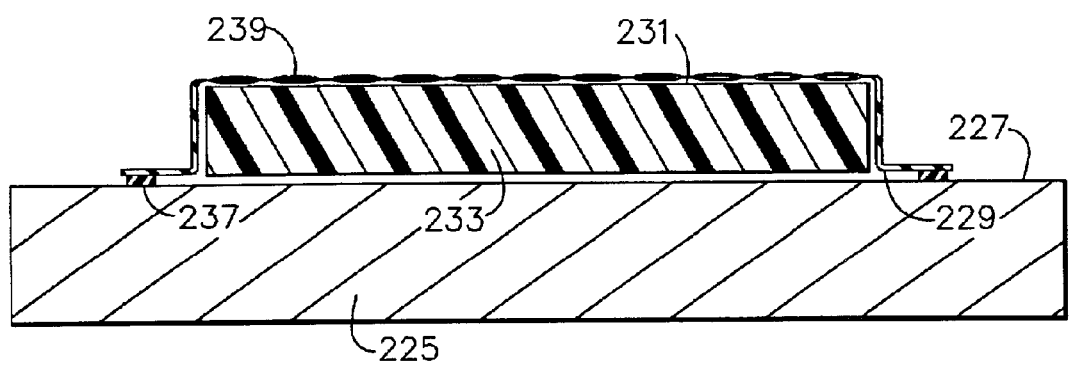
Figure 18A:
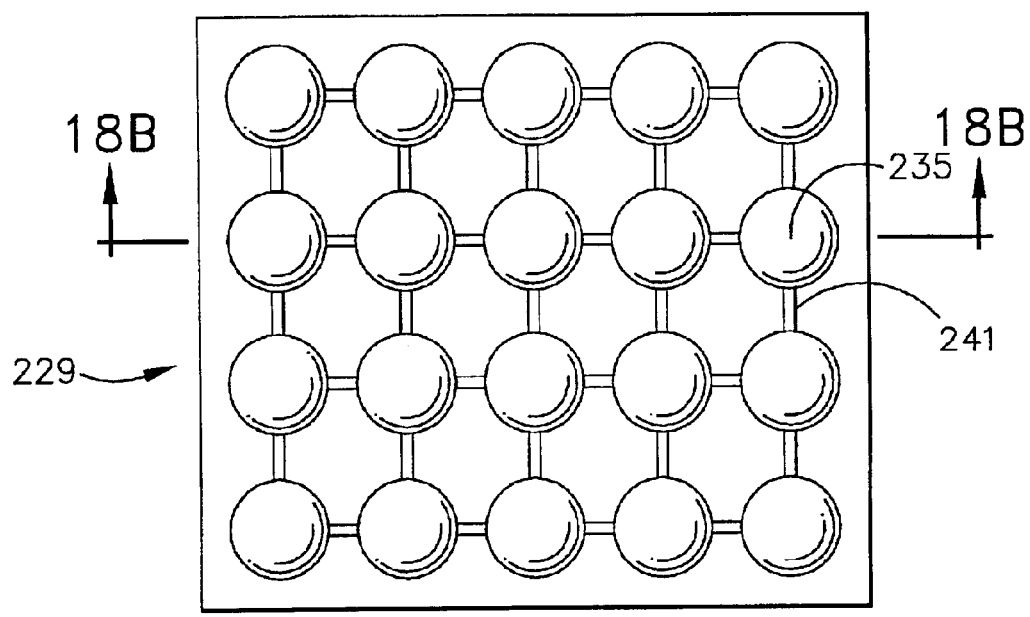
Figure 18B:
Figure 18C:

FIGS. 16 and 17 show a molding apparatus in which the flexible membrane 185 and the bubble mat spacer system 213 of FIG. 13 have been combined into one item 229. In FIG. 16, a preform 233 is placed on a tool surface 227 of a tool 225, and covered with an inflatable bubble mat 229. The bubble mat is sealed at its periphery with a seal 237. The bubbles 235 and the connecting material form resin distribution channels 231 when the bubbles are inflated. FIG. 17 shows the apparatus of FIG. 16 when the bubbles are deflated 239 and the distribution channels 231 are removed. The inflatable bubble mat 229 presses smoothly and evenly upon the preform 233. FIGS. 18A, 18B, and 18C detail some of the features of the inflatable bubble mat. In FIG. 18A, the inflatable bubble mat 229 is shown in a top view. The bubbles 235 are inter-connected via thin passages 241. The system of bubbles and inter-connections allows all the bubbles to be inflated or deflated from one source of compressed gas or vacuum as the case may be. FIGS. 18B and 18C clearly show the cross-sectional shape of the bubble mat in the inflated and deflated configurations. In these figures it is easy to see how the temporary resin distribution channels 231 on the surface of the preform are created and removed by inflating and deflating the bubbles.

Figure 19:
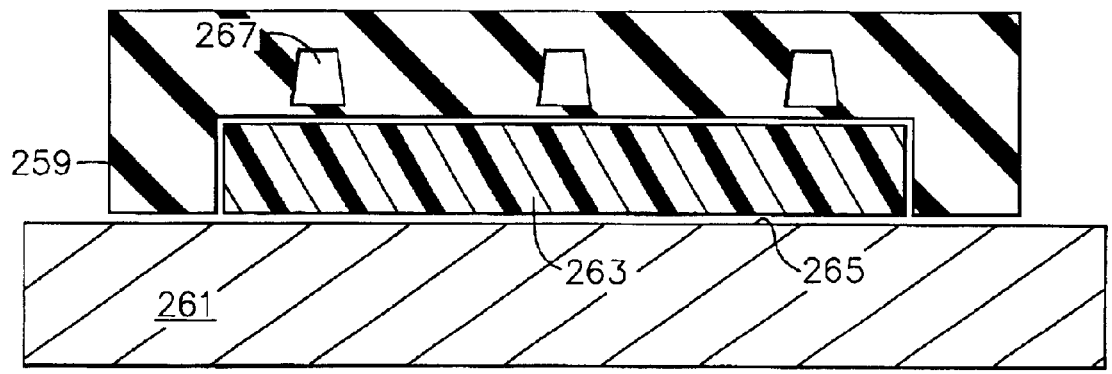
FIGS. 19 and 20 show details of forming channels in a flexible mold.

FIG. 19 shows a mold which incorporates a flexible mold material such a silicone rubber. The surface of the mold is in the shape of the final part when the mold is in the relaxed configuration. A network of resin distribution channels can be made to appear on the surface of the preform by reducing the pressure in a system of channels in the body of the flexible mold material. In the body of the mold half are channels 267 which form a network of passages just beneath the internal surface of the mold.

Figure 20:
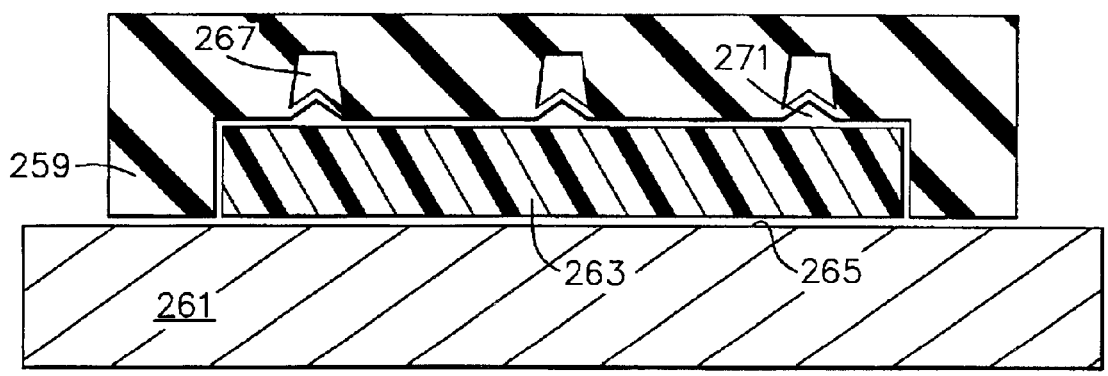

FIG. 19 shows a preform 263 placed on the tool surface 265 and the upper half of the mold 259 made of flexible mold material containing a network of channels 267 beneath the internal surface of the mold. FIG. 20 shows the apparatus of FIG. 19 with the upper mold half 259 deformed to form resin distribution channels 271 on the internal surface of the upper mold half 259.

Figure 21:
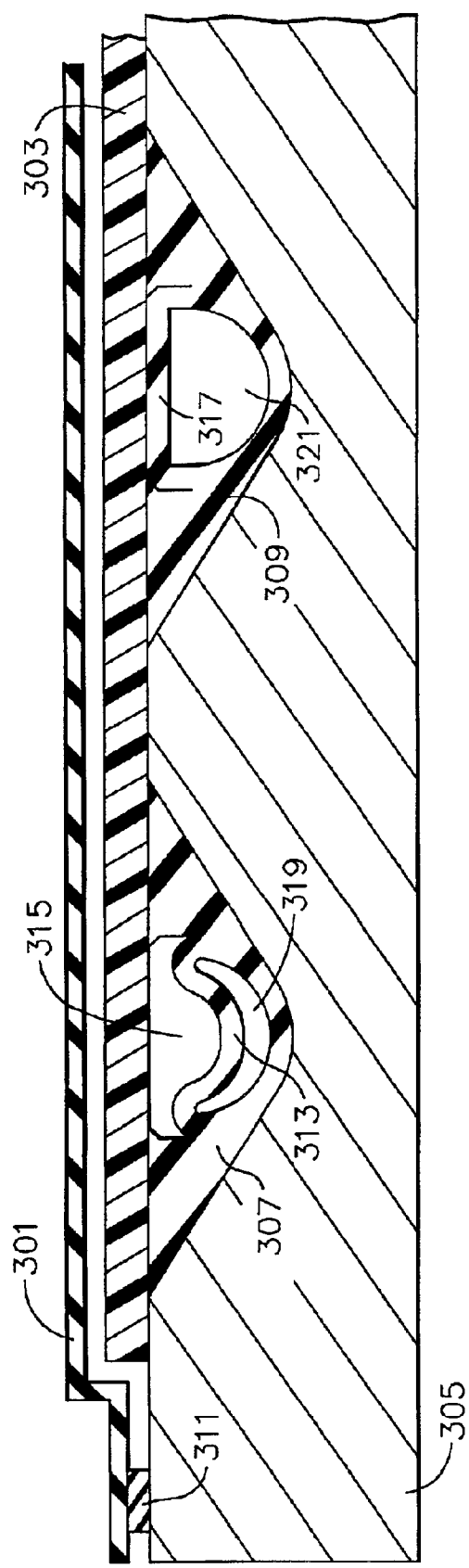
FIG. 21 shows CARTM tubes embedded in a rigid tool.
Figure 22:
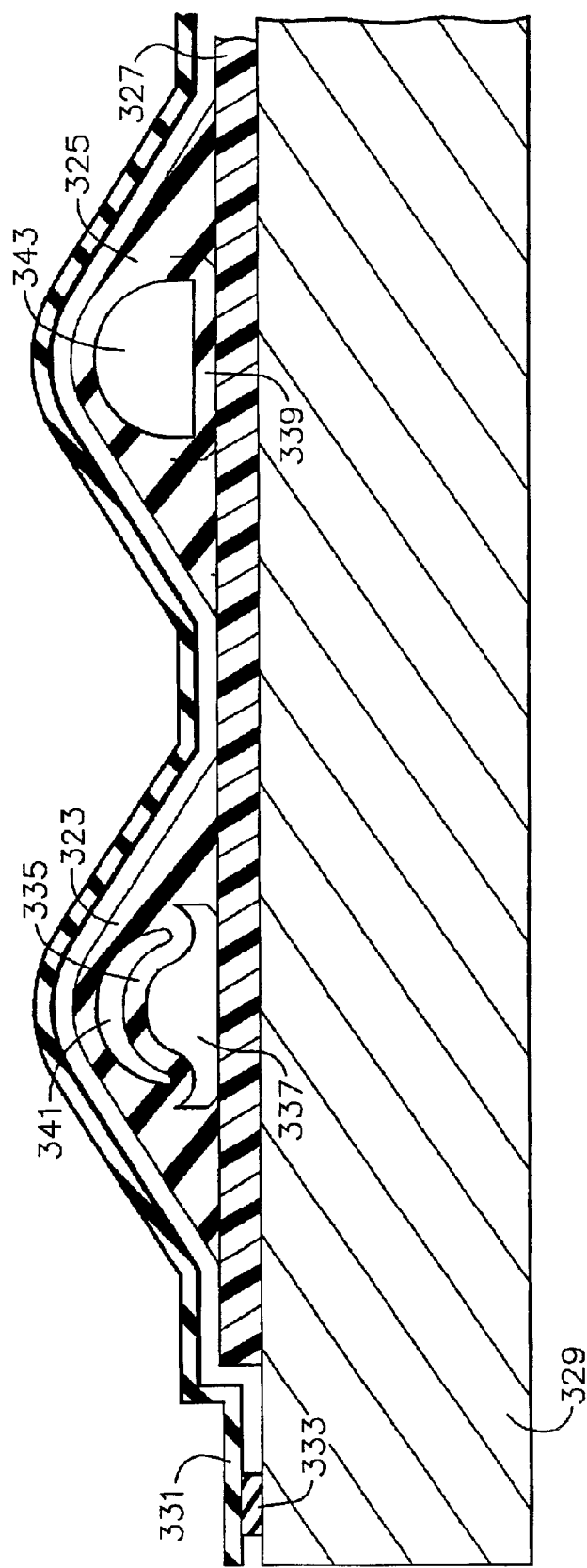
FIG. 22 shows CARTM tubes on a preform and covered by a flexible membrane.
Figure 23:
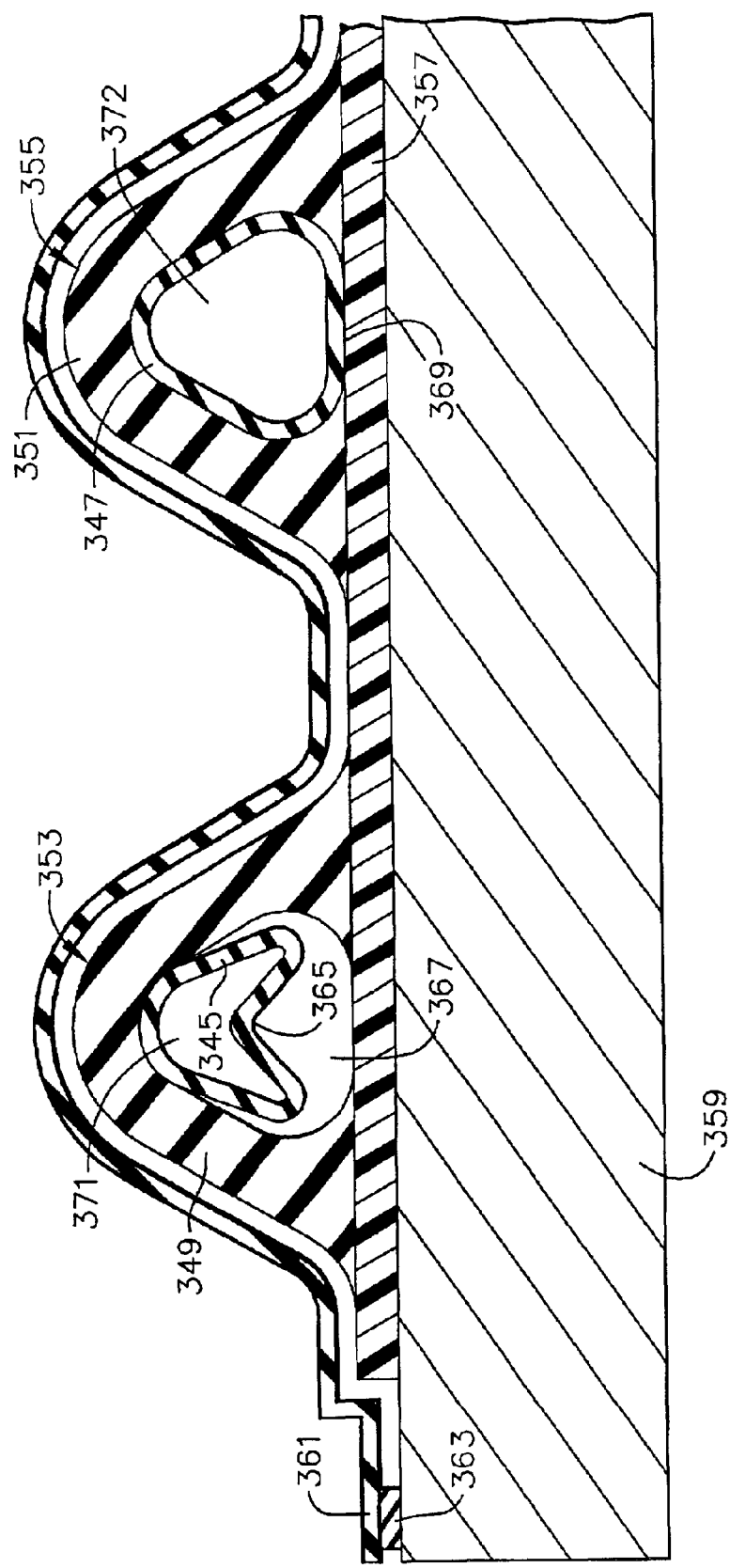
FIG. 23 shows CARTM tubes in extrusions that prevent the flexible membrane from collapsing the tubes.

FIGS. 21 through 23 illustrate three embodiments of inventive hollow tubes, and the methods of their use are collectively referred to as Channel Assisted Resin Transfer Molding or CARTM, and thus, the inventive hollow tubes are referred to as CARTM tubes. Each embodiment is shown with one resin flow pathway in the open position and one resin flow pathway in the closed position.

In FIG. 21, hollow tubes 307 and 309 are in channels in a tool 305. A preform 303 is placed on the tool 305 and over the hollow tubes. Each hollow tube has a tube base that faces the preform. A flexible impermeable membrane 301 is placed over the hollow tubes and preform, and sealed with a seal 311 to the tool 305 at its periphery. The movable portion 313 of the tube of hollow tube 307 is positioned away from the surface of the preform to show a resin flow pathway 315 in the open position, while the movable portion 317 of the tube base of hollow tube 309 is positioned against the surface of the preform to show a resin flow pathway in the closed position. For hollow tube 307, a differential pressure between the tube pressure on the tube inside 319 and a preform pressure on the movable portion of the tube base has moved the movable portion 313 of the tube base to the open position. For hollow tube 309, a different differential pressure between the tube pressure on the tube inside 321 and a preform pressure on the movable portion of the tube base has moved the movable portion 317 of the tube base to the closed position.

In FIG. 22, hollow tubes 323 and 325 are on the upper surface of a preform 327 that is on a surface of a tool 329. A flexible impermeable membrane 331 is placed over the hollow tubes and preform, and sealed with a seal 333 to the tool 329 at its periphery. Each hollow tube has a tube base that faces the preform. The movable portion 335 of the tube base of hollow tube 323 is positioned away from the surface of the preform to show a resin flow pathway 337 in the open position, while the movable portion 339 of the tube base of hollow tube 325 is positioned against the surface of the preform to show a resin flow pathway in the closed position. For hollow tube 323, a differential pressure between the tube pressure on the tube inside 341 and a preform pressure on the movable portion of the tube base has moved the movable portion 335 of the tube base to the open position. For hollow tube 325, a different differential pressure between the tube pressure on the tube inside 343 and a preform pressure on the movable portion of the tube base has moved the movable portion 339 of the tube base to the closed position.

In FIG. 23, hollow tubes 345 and 347 are in channels in extrusions 349 and 351 respectively to form tube-within-a-channel assemblies 353 and 355 on the upper surface of a preform 357 that is on the surface of a tool 359. An impermeable membrane 361 is placed over the hollow tubes and preform, and sealed with a seal 363 to the tool 359 at its periphery. Each hollow tube has a tube base that faces the preform. The movable portion 365 of the tube base of hollow tube 345 is positioned away from the surface of the preform to show a resin flow pathway 367 in the open position, while the movable portion 369 of the tube base of hollow tube 347 is positioned against the surface of the preform to show a resin flow pathway in the closed position. For hollow tube 345, a differential pressure between the tube pressure on the tube inside 371 and a preform pressure on the movable portion of the tube base has moved the movable portion 365 of the tube base to the open position. For hollow tube 347, a different differential pressure between the tube pressure on the tube inside 372 and a preform pressure on the movable portion of the tube base has moved the movable portion 369 of the tube base to the closed position. The extrusions 349 and 351 prevent the impermeable membrane from collapsing the hollow tubes 345 and 347 against the preform 357 when a vacuum is drawn on the preform.

In FIGS. 21–23, the impermeable membranes 301, 331, and 361 can be replaced with a rigid tool surface. This arrangement gives greater dimensional accuracy to the molded part.

Figure 24:
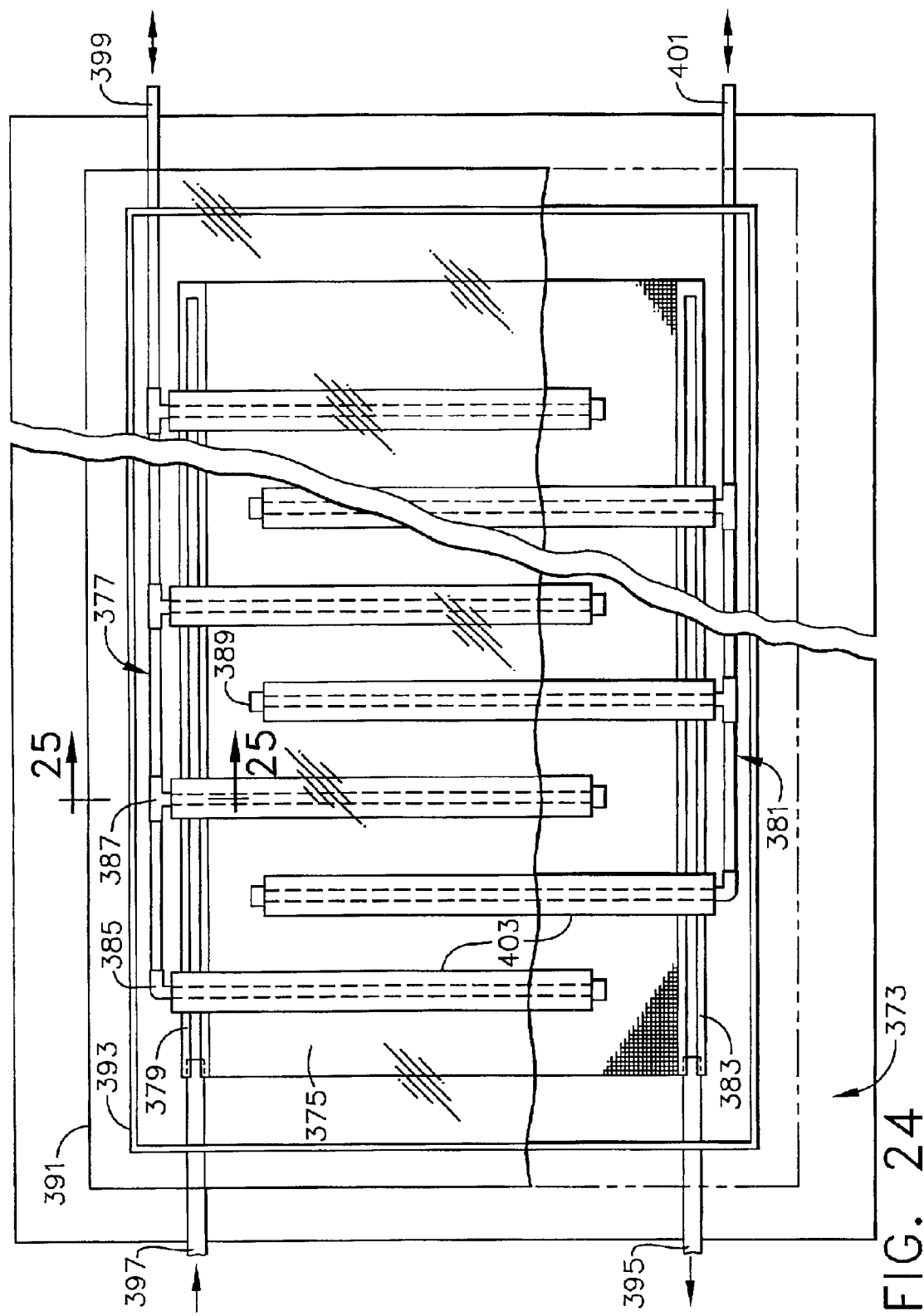
FIG. 24 shows the use of CARTM resin feed tubes and CARTM vacuum tubes.

FIG. 24 shows a tool 373 on which is placed a preform 375. The preform is covered with a network of CARTM tubes 377 that intersect a resin feed manifold 379 that runs along an edge of the preform to a resin source tube 397. These CARTM tubes are called resin feed tubes since their resin flow pathways supply the resin to the preform. A second network of CARTM tubes 381 intersects a vacuum manifold 383 that runs along the opposite edge of the preform to a vacuum source tube 395. These CARTM tubes are called vacuum tubes since their vacuum channels distribute vacuum over the surface of the preform.

The CARTM tube networks 377 and 381 can be created by joining sections of CARTM tubing 403 with elbows 385, T-sections 387, and end caps 389. Each CARTM tube network can be connected to a separate means of adjusting the pressure inside the tubes, thereby allowing the networks to be activated independently of each other. The pressure inside the resin feed CARTM tube network 377 is adjustable through tube 399, while the pressure inside the vacuum channel CARTM tube network 381 is adjustable through tube 401. With sufficient plumbing, each CARTM tube can be controlled individually. This control flexibility allows the progress of the infusion to be controlled quite precisely.

An impermeable membrane 391 is placed over the preform 375, resin manifold 379, vacuum manifold 383 and both CARTM tube networks, and sealed around the periphery with a seal 393, thereby allowing a vacuum to be pulled on the preform 375 through the vacuum port 395. After pulling a vacuum on the preform and on the inside of each of the CARTM tube networks, resin at nearly atmospheric pressure enters the resin feed manifold from the resin source tube 397, and pushes the movable portion of the resin feed CARTM tubes to the open position, thereby forming resin flow pathways on the bottom of the resin feed CARTM tubes. The resin flows along the resin flow pathways and into the preform. The differential pressure of the resin on the outside of the tubes and the vacuum on the inside of the tubes moves the movable portion of the CARTM tubes to the open position. When the preform is infused with resin, the pressure inside both CARTM tube networks is increased until the movable portion of the CARTM tubes is in the closed position.

Figure 25:
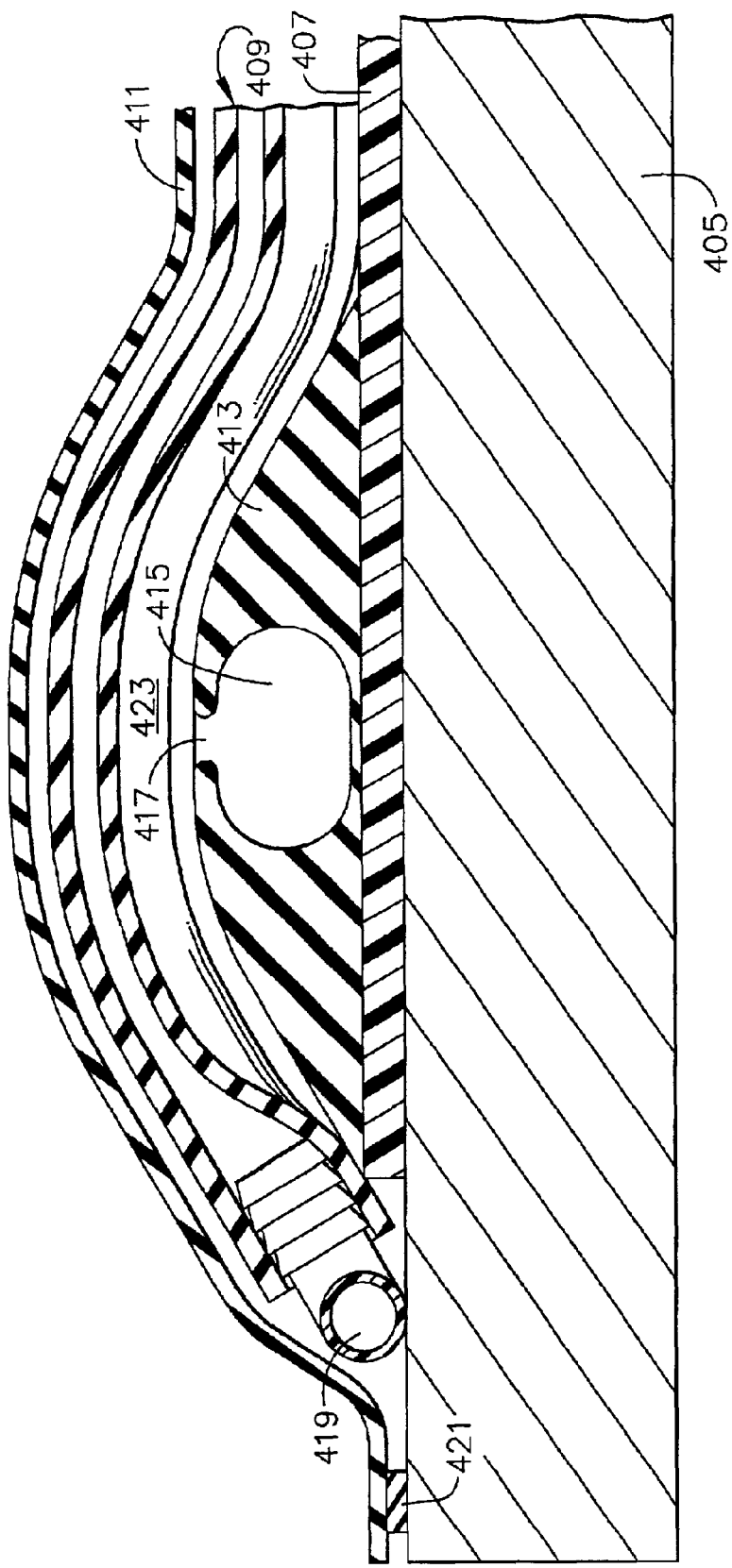
FIG. 25 shows a cross-section of a CARTM tube and either resin feed or vacuum manifold.

FIG. 25 shows a manifold and related CARTM apparatus in cross-sectional view. The preform 407 sits on a tool 405. The manifold 413 is placed on the preform 407. The manifold 413 has a large channel 415 and a gap 417. A CARTM tube 409 runs over the preform 407 and the manifold 413 to a connection with a tube 419 that connects to a means of adjusting the pressure inside the CARTM tube 409. An impermeable membrane 411 is placed over the preform 407, manifold 413, and CARTM tube 409, and sealed around the periphery with a seal 421.

In the case where manifold 413 is a resin feed manifold and the CARTM tube 409 is a resin feed tube, the resin from the resin source tube flows along the channel 415 and then through the gap 417 into the resin flow pathway 423 in the bottom of the CARTM tube 409.

In the case where manifold 413 is a vacuum manifold and the CARTM tube 409 is a vacuum channel tube, the resin from the preform flows along the vacuum channel 423 in the bottom of the CARTM tube 409 and then through the gap 417 into the channel 415 in the manifold.

Figure 26:
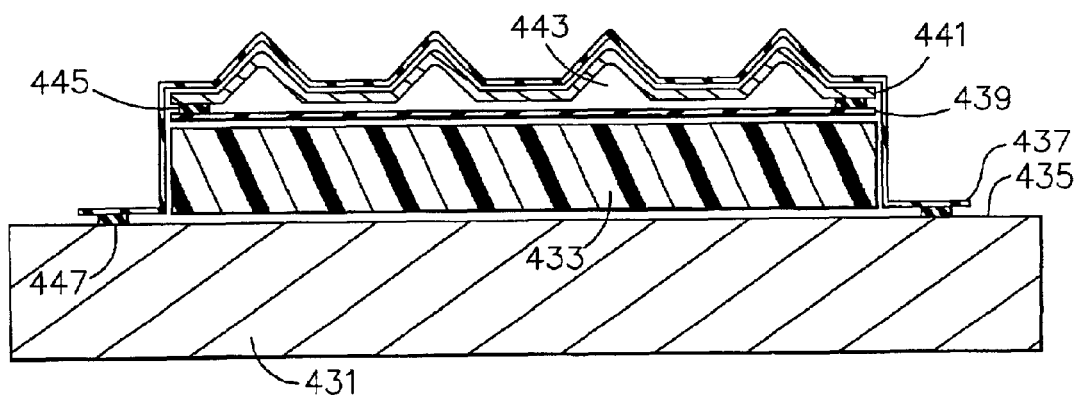
FIGS. 26 and 27 show an impermeable spacer system configured as a bladder over a portion of a preform.
Figure 27:
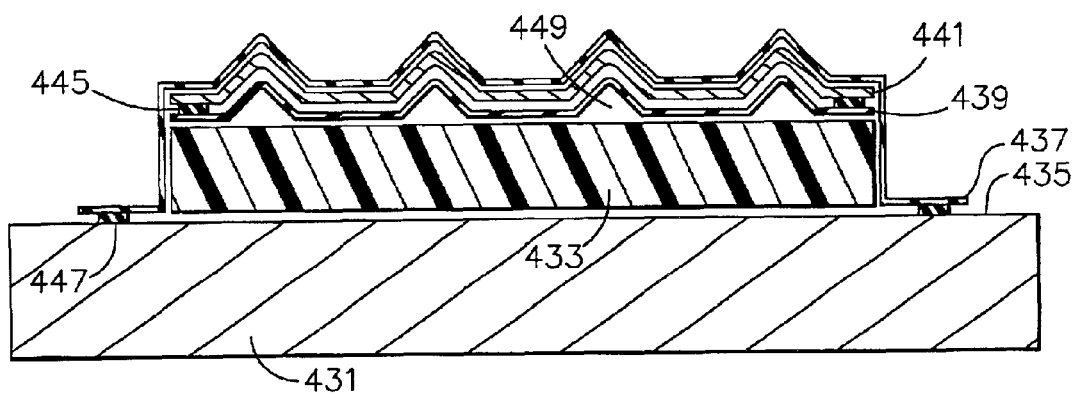

FIG. 26 shows a tool 431 with a surface 435 on which is placed a preform 433. A portion of the preform is covered with a first flexible impermeable membrane 439. An impermeable spacer system 441 is placed on the first flexible impermeable membrane 439 and sealed at its periphery using a seal 445 to form a bladder. The impermeable spacer system 441 has a network of gaps 443. A second flexible impermeable membrane 437 is placed over the impermeable spacer system 441 and the preform 433, and sealed at its periphery with a seal 447. FIG. 27 shows the apparatus of FIG. 26 with the first flexible impermeable membrane 439 deformed into the network of gaps in the impermeable spacer system 441 thereby forming temporary resin flow pathways 449 on the preform.

Figure 28:
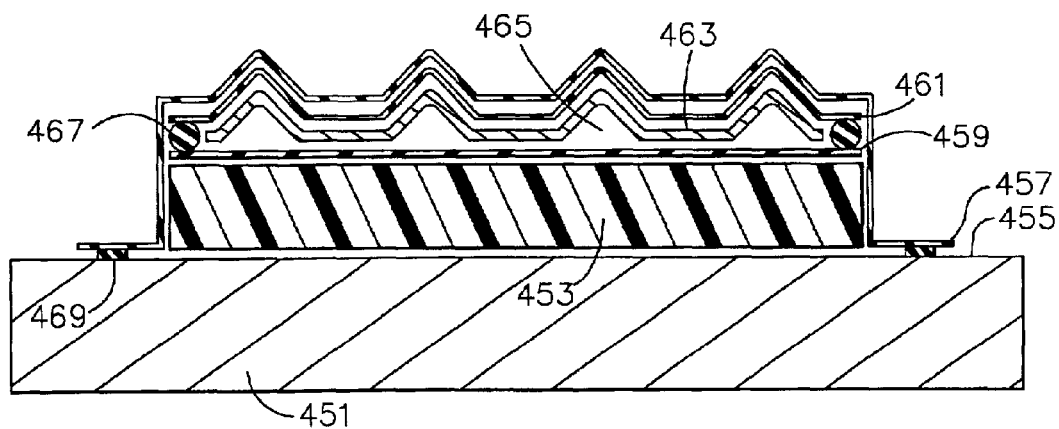
FIGS. 28 and 29 show a spacer system configured as a bladder over a portion of a preform.
Figure 29:
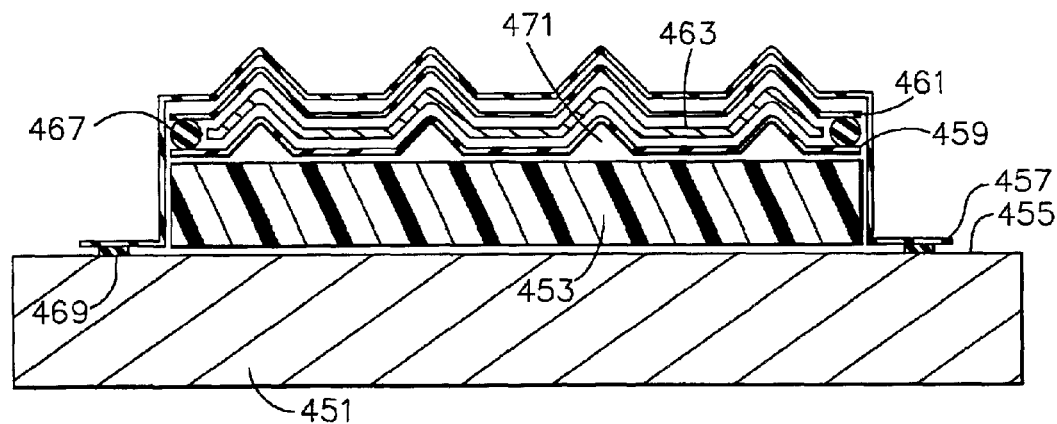

FIG. 28 shows a tool 451 with a surface 455 on which is placed a preform 453. A portion of the preform is covered with a first flexible impermeable membrane 459. A spacer system 463 is placed on the first flexible impermeable membrane 459. A second flexible impermeable membrane 461 is placed over the spacer system 463 and sealed at its periphery using a seal 467. The first flexible impermeable membrane 459, the spacer system 463, and the second flexible impermeable membrane 461 together form a bladder. The spacer system 463 has a network of gaps 465. A third flexible impermeable membrane 457 is placed over the spacer system 463 and the preform 453, and sealed at its periphery with a seal 469. FIG. 29 shows the apparatus of FIG. 28 with the first flexible impermeable membrane 459 deformed into the network of gaps in the spacer system 463 thereby forming temporary resin flow pathways 471 on the preform.

What is claimed is:

1. A method of molding a composite by flowing a resin into a preform comprising:
   a. providing a mold surface;
   b. placing said preform on said mold surface;
   c. placing a first flexible impermeable membrane over a portion of said preform, said first impermeable membrane having a preform side adjacent said preform;
   d. placing an impermeable spacer system on said first flexible impermeable membrane, said first flexible impermeable membrane having a spacer system side adjacent said impermeable spacer system;
   e. sealing said first flexible impermeable membrane to said impermeable spacer system, thereby enclosing a network of gaps and forming a bladder;
   f. providing a means of adjusting a spacer system pressure on said spacer system side of said first flexible impermeable membrane;
   g. placing a second flexible impermeable membrane over said impermeable spacer system and said preform;
   h. drawing a vacuum on said preform;
   i. providing a source of said resin in communication with said preform side of said first flexible impermeable membrane;
   j. applying a resin pressure on said preform side of said first flexible impermeable membrane that is higher than said spacer system pressure on said spacer system side of said first flexible impermeable membrane thereby creating a differential pressure that deforms said first flexible impermeable membrane into said network of gaps in said impermeable spacer system, said first flexible impermeable membrane forming temporary resin flow pathways on said preform while deformed into said network of gaps;
   k. flowing said resin along said temporary resin flow pathways and from said temporary resin flow pathways into said preform;
   l. reversing said differential pressure thereby causing said first flexible impermeable membrane to press evenly upon said preform to remove said temporary resin flow pathways;

m. curing said resin in said preform to form said composite.

2. The method of claim 1, wherein creating said differential pressure comprises applying a vacuum to said spacer system side of said first flexible impermeable membrane, and reversing said differential pressure comprises applying substantially atmospheric pressure to said spacer system side of said first flexible impermeable membrane.

3. The method of claim 2, wherein said source of said resin is substantially at atmospheric pressure.

4. The method of claim 1, wherein said impermeable spacer system comprises a bubble mat.

5. The method of claim 4, wherein said impermeable spacer system comprises an inflatable bubble mat.

6. The method of claim 1, wherein said impermeable spacer system comprises a flexible sheet with a network of gaps.

7. The method of claim 2, wherein said impermeable spacer system comprises a flexible sheet with a network of gaps.

8. The method of claim 3, wherein said impermeable spacer system comprises a flexible sheet with a network of gaps.

9. The method of claim 1, further comprising a plurality of said bladders.

10. A method of molding a composite by flowing a resin into a preform comprising:
   a. providing a mold surface;
   b. placing said preform on said mold surface;
   c. placing a first flexible impermeable membrane over a portion of said preform, said first impermeable membrane having a preform side adjacent said preform;
   d. placing a spacer system on said first flexible impermeable membrane, said first flexible impermeable membrane having a spacer system side adjacent said spacer system;
   e. placing a second flexible impermeable membrane over said spacer system;
   f. sealing said first flexible impermeable membrane to said second flexible impermeable membrane, thereby enclosing said spacer system and forming a bladder;
   g. providing a means of adjusting a spacer system pressure on said spacer system side of said first flexible impermeable membrane;
   h. placing a third flexible impermeable membrane over said second impermeable membrane and said preform;
   i. drawing a vacuum on said preform;
   j. providing a source of said resin in communication with said preform side of said first flexible impermeable membrane;
   k. applying a resin pressure on said preform side of said first flexible impermeable membrane that is higher than said spacer system pressure on said spacer system side of said first flexible impermeable membrane thereby creating a differential pressure that deforms said first flexible impermeable membrane into a network of gaps in said spacer system, said first flexible impermeable membrane forming temporary resin flow pathways on said preform while deformed into said network of gaps;
   l. flowing said resin along said temporary resin flow pathways and from said temporary resin flow pathways into said preform;
   m. reversing said differential pressure thereby causing said first flexible impermeable membrane to press evenly upon said preform to remove said temporary resin flow pathways;
   n. curing said resin in said preform to form said composite.

11. The method of claim 10, wherein creating said differential pressure comprises applying a vacuum to said spacer system side of said first flexible impermeable membrane and reversing said differential pressure comprises applying substantially atmospheric pressure to said spacer system side of said first flexible impermeable membrane.

12. The method of claim 11, wherein said source of said resin is substantially at atmospheric pressure.

13. The method of claim 10, wherein said spacer system comprises a link mat.

14. The method of claim 10, wherein said spacer system comprises a bubble mat.

15. The method of claim 14, wherein said spacer system comprises an inflatable bubble mat.

16. The method of claim 10, wherein said spacer system comprises a fabric mat.

17. The method of claim 10, wherein said spacer system comprises a flexible sheet with a network of gaps.

18. The method of claim 11, wherein said spacer system comprises a flexible sheet with a network of gaps.

19. The method of claim 12, wherein said spacer system comprises a flexible sheet with a network of gaps.

20. The method of claim 10, further comprising a plurality of said bladders.

21. A method for molding a composite by infusing a resin into a preform contained in a mold, comprising:
   a. providing a mold surface;
   b. providing at least one hollow tube comprising a tube inside and a tube outside;
      i. said tube outside having a tube base;
      ii. said mold surface surrounding at least a portion of said hollow tube and structurally adapted to hold said tube base substantially adjacent to said preform;
      iii. said tube base having a movable portion comprising a compliant material;
      iv. said movable portion being structurally adapted to move in response to a differential pressure between a tube pressure on said tube inside and a base pressure on said tube base;
      v. said movable portion being in an open position when said movable portion is positioned away from said preform;
      vi. said movable portion being in a closed position when said movable portion is positioned substantially adjacent said preform; and
      vii. said movable portion forming a temporary resin flow pathway on said preform when said movable portion is in said open position;
   c. providing a differential pressure-adjustment means for adjusting said differential pressure;
   d. forming said resin flow pathway by moving said movable portion to said open position;
   e. providing a source of said resin in communication with said temporary resin flow pathway;
   f. flowing said resin along said temporary resin flow pathway and from said temporary resin flow pathway into said preform;
   g. moving said movable portion to said closed position to remove said temporary resin flow pathway; and
   h. curing said resin in said preform to form said composite.

22. The method of claim 21 further comprising providing a tube pressure-adjustment means for adjusting said tube pressure, thereby controlling said differential pressure.

23. The method of claim 21 further comprising drawing a vacuum on said preform during the flowing of said resin.

24. The method of claim 21 wherein said hollow tube is in a channel in an extrusion.

25. The method of claim 21 wherein said hollow tube is in a channel in a tool.

26. The method of claim 23 further comprising providing an impermeable membrane that covers said hollow tube and said preform.

27. A method for molding a composite by infusing a resin into a preform contained in a mold, comprising:
   a. providing a mold surface;
      i. said mold surface having a movable portion;
      ii. said movable portion being in an open position when said movable portion is positioned away from said preform;
      iii. said movable portion being in a closed position when said movable portion is positioned substantially adjacent said preform; and
      iv. said movable portion and said preform forming a vacuum channel when said movable portion is in said open position;
   b. providing a source of vacuum in communication with said vacuum channel;
   c. infusing said preform with said resin;
   d. forming said vacuum channel by moving said movable portion to said open position;
   e. flowing said resin from said preform into said vacuum channel;
   f. moving said movable portion to said closed position; and
   g. curing said resin in said preform.

28. The method of claim 27 wherein:
   a. said movable portion comprises a movable compliant material; and
   b. said movable compliant material is moved by a differential pressure force between said open position and said closed position.

29. The method of claim 28 wherein said movable compliant material comprises a portion of a hollow tube.

* * * * *